(12) United States Patent  
Buckley et al.

(10) Patent No.: US 11,056,037 B1  
(45) Date of Patent: *Jul. 6, 2021

(54) HYBRID PULSE WIDTH MODULATION FOR DISPLAY DEVICE

(71) Applicant: Facebook Technologies, LLC, Menlo Park, CA (US)

(72) Inventors: Edward Buckley, Melrose, MA (US); Larry Seiler, Redmond, WA (US); William Thomas Blank, Bellevue, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/260,804

(22) Filed: Jan. 29, 2019

Related U.S. Application Data

(60) Provisional application No. 62/766,619, filed on Oct. 24, 2018.

(51) Int. Cl.
*G09G 3/20* (2006.01)
*G06F 1/16* (2006.01)

(52) U.S. Cl.
CPC .......... *G09G 3/2003* (2013.01); *G06F 1/163* (2013.01); *G09G 2320/064* (2013.01); *G09G 2320/0666* (2013.01)

(58) Field of Classification Search
CPC ..... G09G 2320/064; G09G 2320/0666; G09G 2300/0443; G09G 3/2081; G09G 3/32–3291; G06F 1/163
See application file for complete search history.

(56) References Cited

U.S. PATENT DOCUMENTS

| 2010/0177072 | A1* | 7/2010 | Kawabe | G09G 3/3266 345/205 |
| 2012/0044224 | A1* | 2/2012 | Michisaka | G09G 3/3426 345/207 |
| 2012/0281028 | A1* | 11/2012 | Orlick | G09G 3/3426 345/690 |
| 2013/0176351 | A1* | 7/2013 | Abele | G09G 3/3406 345/690 |
| 2014/0139498 | A1* | 5/2014 | Hussain | H05B 47/23 345/204 |
| 2016/0121073 | A1* | 5/2016 | Mok | A61N 5/0618 600/27 |
| 2019/0327809 | A1* | 10/2019 | Watsuda | H05B 45/10 |

* cited by examiner

*Primary Examiner* — Alexander Eisen
*Assistant Examiner* — Nathaniel P Brittingham
(74) *Attorney, Agent, or Firm* — Fenwick & West LLP

(57) ABSTRACT

A display operates a plurality of light emitters using pulse width modulations (PWM). Pixel data for a pixel location may be separated into a first subset of bits and a second subset of bits. The display device turns on first light emitters for first PWM turn-on times in accordance with the first subset of bits within a PWM cycle. The display device turns on second light emitters for PWM on time second PWM turn-on times in accordance with the second subset of bits within the PWM cycle. The current level that drives the first emitters may remain constant during the first turn-on times but may be higher than the current level that drives the second emitters. The first emitters may generate light in accordance with the most significant bits of pixel data while the second emitters may generate light in accordance with the least significant bits of the pixel data.

20 Claims, 14 Drawing Sheets

HYBRID PULSE WIDTH MODULATION FOR DISPLAY DEVICE

CROSS REFERENCE TO RELATED APPLICATIONS

This application claims the benefit of U.S. Provisional Patent Application Ser. No. 62/766,619, filed on Oct. 24, 2018, the content of which is incorporated herein by reference in its entirety for all purposes.

BACKGROUND

This disclosure relates to structure and operation of a display device and more specifically to using two or more pulse width modulation schemes to drive different light emitters in a display device.

A display device is often used in a virtual reality (VR) or augmented-reality (AR) system as a head-mounted display or a near-eye display. In some display devices, light is projected to different locations of an image field within a display period to form an image. As such, a light emitter of the display device is responsible for generating light for different pixel locations within a display period. To provide users with the best perception of reality, the color of the display device needs to be precise. This requires the display device to have a high color depth. It has been challenging to operate light emitters at high frequency while providing the color depth required for a VR or AR system.

SUMMARY

Embodiments described herein generally relate to a display device with multiple light emitters that are driven by pulse width modulation (PWM) signals that have different current levels and turn-on times based on pixel data that is separated into two or more subsets of bits in order to generate a precise color. For a given pixel location, the corresponding pixel data having a set of bits representing a color value of the pixel location may be separated by a driver circuit of the display device into two subsets of bits. The display device generates, in accordance with the first subset of bits, a first PWM signal with a first level of current and first turn-on times to drive one or more first light emitters. The display device also generates, in accordance with the second subset of bits, a second PWM signal with a second level of current and second turn-on times to drive one or more second light emitters. The first and second light emitters collectively form a color at the pixel location.

In accordance with an embodiment, the display device may include a plurality of light emitters and a rotatable mirror. The rotatable mirror reflects and projects light emitted by the light emitters to an image field. As the mirror rotates, light is projected to different areas of the image field. After the light moves from one side of the image field to another side (e.g., completely scans the image field), an image is formed and a display period is completed. During a display period, a pixel location in the image field is illuminated by light emitters that are driven by different PWM signals. The overall color value of a given pixel location is, therefore, a temporal sum of the light projected to the pixel location.

In accordance with an embodiment, similar PWM schemes but with different current levels and turn-on times are used to drive different light emitters to form the color at a given pixel location. The PWM schemes may generally have multiple potentially on-intervals within a PWM cycle. Whether a particular potentially on-interval is in fact turned on depends on the bit value for a given PWM cycle. The total turn-on times during a PWM cycle is the total duration of the potentially on-intervals that are turned on. In general, the higher the bit value represents, the more potentially on-intervals are turned on and the longer are the turn-on times. For a pixel location, the bits of a color included in the pixel data may be divided into a first subset of bits and a second subset of bits. In accordance with the first subset of bits, the display device turns on one or more first light emitters by providing current of a first level during first turn-on times within a PWM cycle in a display period. The light generated by the first light emitters is projected onto the pixel location. In accordance with the second subset of bits, the display device turns on one or more second light emitters by providing current of a second level during second turn-on times with the PWM cycle in the display period. The light generated by the second light emitters is also projected onto the pixel location. Hence, the first and second light emitters collectively generate a color.

In accordance with an embodiment, the first light emitters are responsible for generating light that represents the most significant bits (MSBs) of pixel data while the second light emitters are responsible for generating light that represents the least significant bits (LSBs) of the pixel data. For a given pixel location during a PWM cycle, the bits of a color value of the pixel data is separated into MSBs and LSBs. MSBs are used to modulate first PWM signals that drive the first light emitters and the LSBs are used to modulate second PWM signals that drive the second light emitters. The current level of the second PWM signals is a fraction of the first PWM signals so that the light emitted by the second light emitters represent the LSBs of the color value. Using such two or more PWM schemes, the color value at pixel location can be precisely controlled.

The figures depict embodiments of the present disclosure for purposes of illustration only.

DETAILED DESCRIPTION

Embodiments relate to a display device that uses two or more pulse width modulation (PWM) schemes to drive different light emitters so that the precise color value at a pixel location is controlled by the PWM schemes. To change a color value of a light emitter, the display device controls the turn-on times of the light emitter within a PWM cycle to adjust the perceived color level of the light emitter. The longer the light emitter driven with a constant current level is turned on within a PWM cycle, the "brighter" the light emitter is perceived. However, since each light emitter of a display device is often responsible for producing light with at a large number of greyscale levels (e.g., 256 distinctive greyscale levels), the control of a light emitter using turn-on times within a PWM cycle involves an extremely fast clock in order to distinguish a fine difference between two adjacent greyscale levels (e.g., $\frac{1}{256}$ unit length of time difference). Such a clock may be challenging or too costly to produce. In accordance with an embodiment, the display device may have at least two groups of light emitters. Each group of light emitters is controlled by a different PWM scheme with a different current level. Each group is responsible for a subset of bits of a color value. The two group of light emitters cooperate to produce color value at a specific greyscale level.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Near-Eye Display

Figure 1:
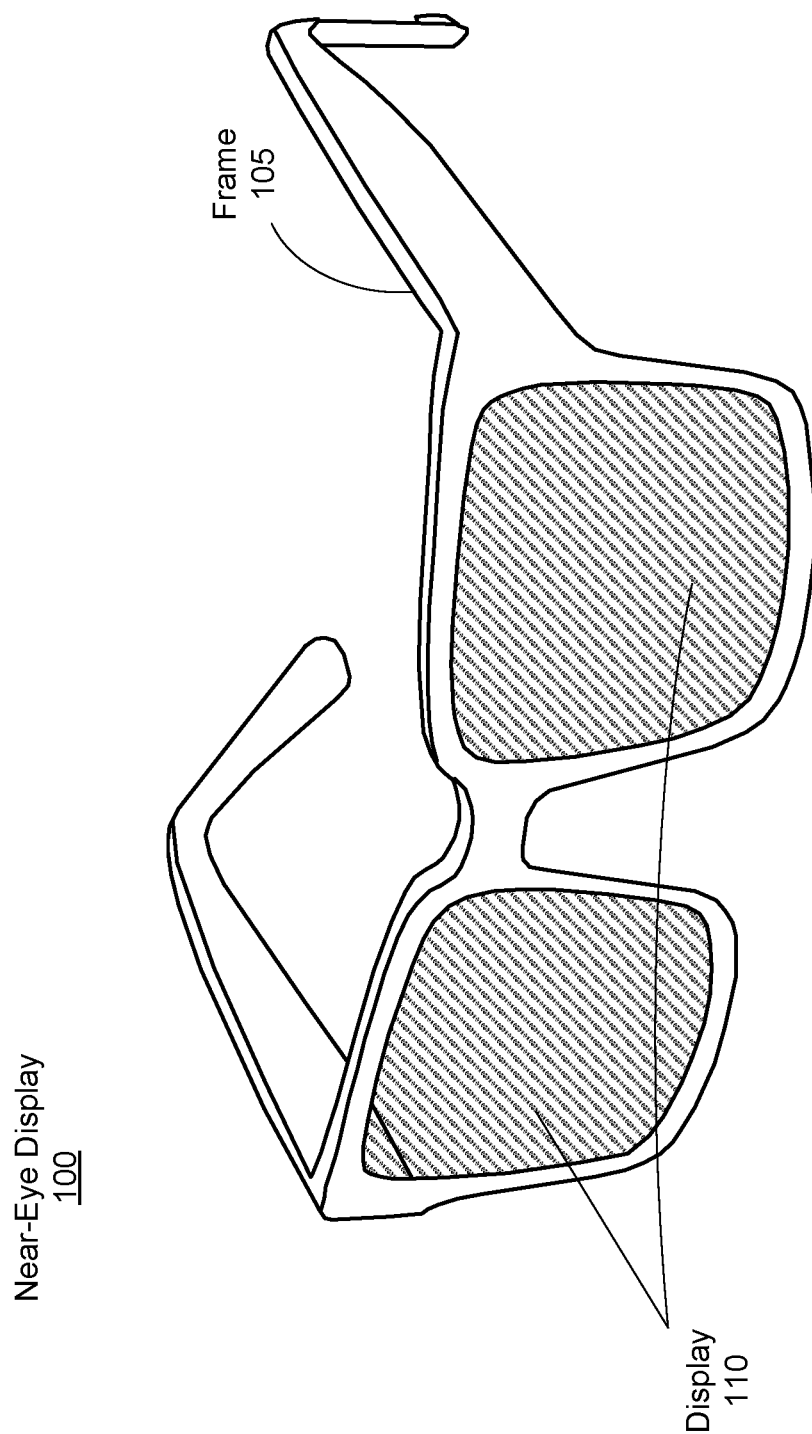
FIG. 1 is a perspective view of a near-eye-display (NED), in accordance with an embodiment.

FIG. 1 is a diagram of a near-eye display (NED) 100, in accordance with an embodiment. The NED 100 presents media to a user. Examples of media presented by the NED 100 include one or more images, video, audio, or some combination thereof. In some embodiments, audio is presented via an external device (e.g., speakers and/or headphones) that receives audio information from the NED 100, a console (not shown), or both, and presents audio data based on the audio information. The NED 100 may operate as a VR NED. However, in some embodiments, the NED 100 may be modified to also operate as an augmented reality (AR) NED, a mixed reality (MR) NED, or some combination thereof. For example, in some embodiments, the NED 100 may augment views of a physical, real-world environment with computer-generated elements (e.g., images, video, sound, etc.).

The NED 100 shown in FIG. 1 includes a frame 105 and a display 110. The frame 105 includes one or more optical elements which together display media to users. The display 110 is configured for users to see the content presented by the NED 100. As discussed below in conjunction with FIG. 2, the display 110 includes at least a source assembly to generate an image light to present media to an eye of the user. The source assembly includes, e.g., a light source, an optics system, or some combination thereof.

FIG. 1 is only an example of a VR system. However, in alternate embodiments, FIG. 1 may also be referred to as a Head-Mounted-Display (HMD).

Figure 2:
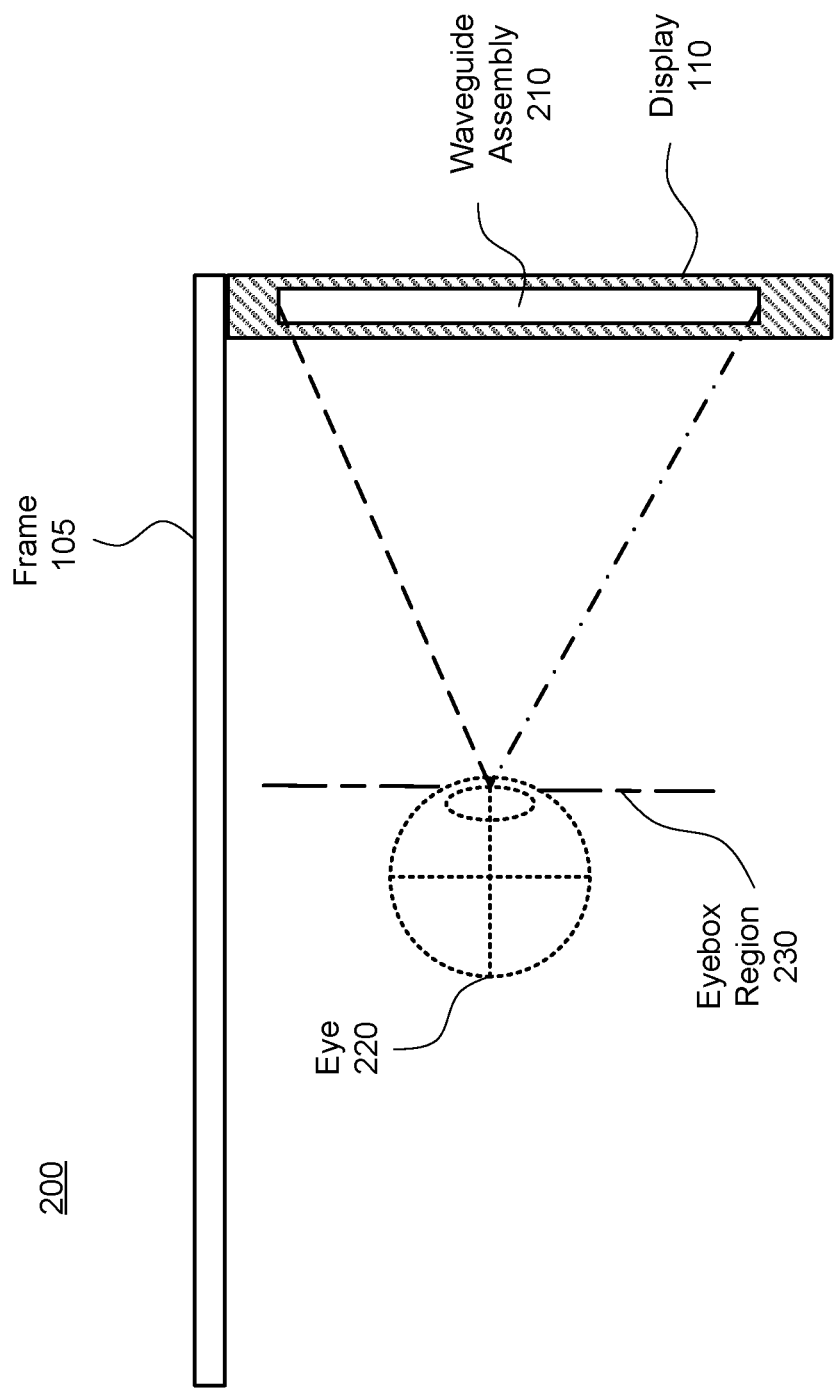
FIG. 2 is a cross-section of an eyewear of the NED illustrated in FIG. 1, in accordance with an embodiment.

FIG. 2 is a cross section 200 of the NED 100 illustrated in FIG. 1, in accordance with an embodiment. The cross section 200 illustrates at least one waveguide assembly 210. An exit pupil is a location where the eye 220 is positioned in an eyebox region 230 when the user wears the NED 100. In some embodiments, the frame 105 may represent a frame of eye-wear glasses. For purposes of illustration, FIG. 2 shows the cross section 200 associated with a single eye 220 and a single waveguide assembly 210, but in alternative embodiments not shown, another waveguide assembly which is separate from the waveguide assembly 210 shown in FIG. 2, provides image light to another eye 220 of the user.

The waveguide assembly 210, as illustrated below in FIG. 2, directs the image light to the eye 220 through the exit pupil. The waveguide assembly 210 may be composed of one or more materials (e.g., plastic, glass, etc.) with one or more refractive indices that effectively minimize the weight and widen a field of view (hereinafter abbreviated as 'FOV') of the NED 100. In alternate configurations, the NED 100 includes one or more optical elements between the waveguide assembly 210 and the eye 220. The optical elements may act (e.g., correct aberrations in image light emitted from the waveguide assembly 210) to magnify image light emitted from the waveguide assembly 210, some other optical adjustment of image light emitted from the waveguide assembly 210, or some combination thereof. The example for optical elements may include an aperture, a Fresnel lens, a convex lens, a concave lens, a filter, or any other suitable optical element that affects image light. In one embodiment, the waveguide assembly 210 may produce and direct many pupil replications to the eyebox region 230, in a manner that will be discussed in further detail below in association with FIG. 5B.

Figure 3A:
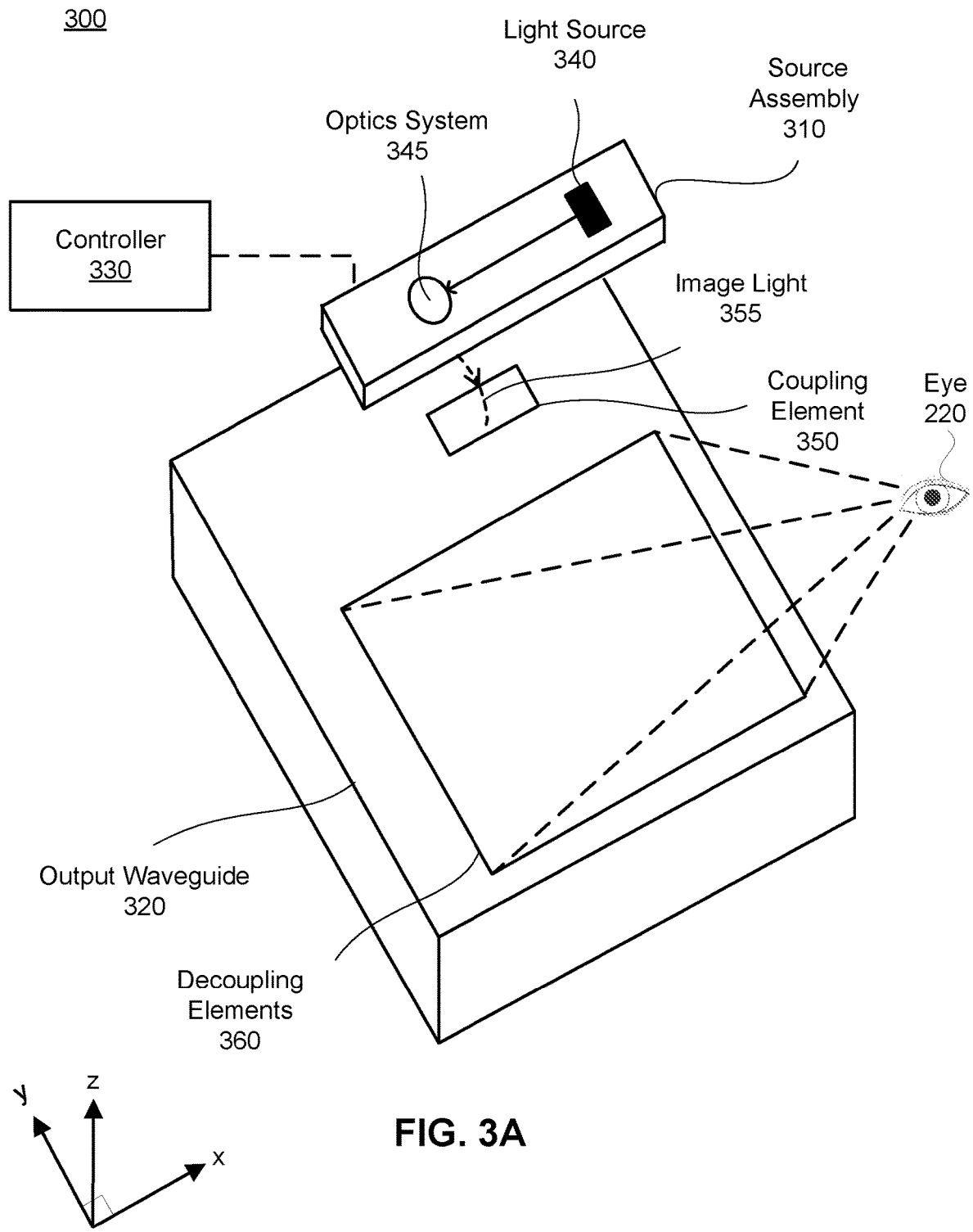
FIG. 3A is a perspective view of a display device, in accordance with an embodiment.

FIG. 3A illustrates a perspective view of a display device 300, in accordance with an embodiment. In some embodiments, the display device 300 is a component (e.g., the waveguide assembly 210 or part of the waveguide assembly 210) of the NED 100. In alternative embodiments, the display device 300 is part of some other NEDs, or another system that directs display image light to a particular location. Depending on embodiments and implementations, the display device 300 may also be referred to as a waveguide display and/or a scanning display. However, in other embodiment, the display device 300 does not include a scanning mirror. For example, the display device 300 can include matrices of light emitters that project light on an image field through a waveguide but without a scanning mirror. In another embodiment, the image emitted by the two-dimensional matrix of light emitters may be magnified by an optical assembly (e.g., lens) before the light arrives a waveguide or a screen.

For a particular embodiment that uses a waveguide and an optical system, the display device 300 may include a source assembly 310, an output waveguide 320, and a controller 330. The display device 300 may provide images for both eyes or for a single eye. For purposes of illustration, FIG. 3A shows the display device 300 associated with a single eye 220. Another display device (not shown), separated (or partially separated) from the display device 300, provides image light to another eye of the user. In a partially separated system, one or more components may be shared between display devices for each eye.

The source assembly 310 generates image light 355. The source assembly 310 includes a light source 340 and an optics system 345. The light source 340 is an optical component that generates image light using a plurality of light emitters arranged in a matrix. Each light emitter may emit monochromatic light. The light source 340 generates image light including, but not restricted to, Red image light, Blue image light, Green image light, infra-red image light, etc. While RGB is often discussed in this disclosure, embodiments described herein are not limited to using red, blue and green as primary colors. Other colors are also possible to be used as the primary colors of the display device. Also, a display device in accordance with an embodiment may use more than three primary colors.

The optics system 345 performs a set of optical processes, including, but not restricted to, focusing, combining, conditioning, and scanning processes on the image light generated by the light source 340. In some embodiments, the optics system 345 includes a combining assembly, a light conditioning assembly, and a scanning mirror assembly, as described below in detail in conjunction with FIG. 3B. The source assembly 310 generates and outputs an image light 355 to a coupling element 350 of the output waveguide 320.

The output waveguide 320 is an optical waveguide that outputs image light to an eye 220 of a user. The output waveguide 320 receives the image light 355 at one or more coupling elements 350, and guides the received input image light to one or more decoupling elements 360. The coupling element 350 may be, e.g., a diffraction grating, a holographic grating, some other element that couples the image light 355 into the output waveguide 320, or some combination thereof. For example, in embodiments where the coupling element 350 is diffraction grating, the pitch of the diffraction grating is chosen such that total internal reflection occurs, and the image light 355 propagates internally toward the decoupling element 360. The pitch of the diffraction grating may be in the range of 300 nm to 600 nm.

The decoupling element 360 decouples the total internally reflected image light from the output waveguide 320. The decoupling element 360 may be, e.g., a diffraction grating, a holographic grating, some other element that decouples image light out of the output waveguide 320, or some combination thereof. For example, in embodiments where the decoupling element 360 is a diffraction grating, the pitch of the diffraction grating is chosen to cause incident image light to exit the output waveguide 320. An orientation and position of the image light exiting from the output waveguide 320 are controlled by changing an orientation and position of the image light 355 entering the coupling element 350. The pitch of the diffraction grating may be in the range of 300 nm to 600 nm.

The output waveguide 320 may be composed of one or more materials that facilitate total internal reflection of the image light 355. The output waveguide 320 may be composed of e.g., silicon, plastic, glass, or polymers, or some combination thereof. The output waveguide 320 has a relatively small form factor. For example, the output waveguide 320 may be approximately 50 mm wide along X-dimension, 30 mm long along Y-dimension and 0.5-1 mm thick along Z-dimension.

The controller 330 controls the image rendering operations of the source assembly 310. The controller 330 determines instructions for the source assembly 310 based at least on the one or more display instructions. Display instructions are instructions to render one or more images. In some embodiments, display instructions may simply be an image file (e.g., bitmap). The display instructions may be received from, e.g., a console of a VR system (not shown here). Scanning instructions are instructions used by the source assembly 310 to generate image light 355. The scanning instructions may include, e.g., a type of a source of image light (e.g., monochromatic, polychromatic), a scanning rate, an orientation of a scanning apparatus, one or more illumination parameters, or some combination thereof. The controller 330 includes a combination of hardware, software, and/or firmware not shown here so as not to obscure other aspects of the disclosure.

Figure 3B:
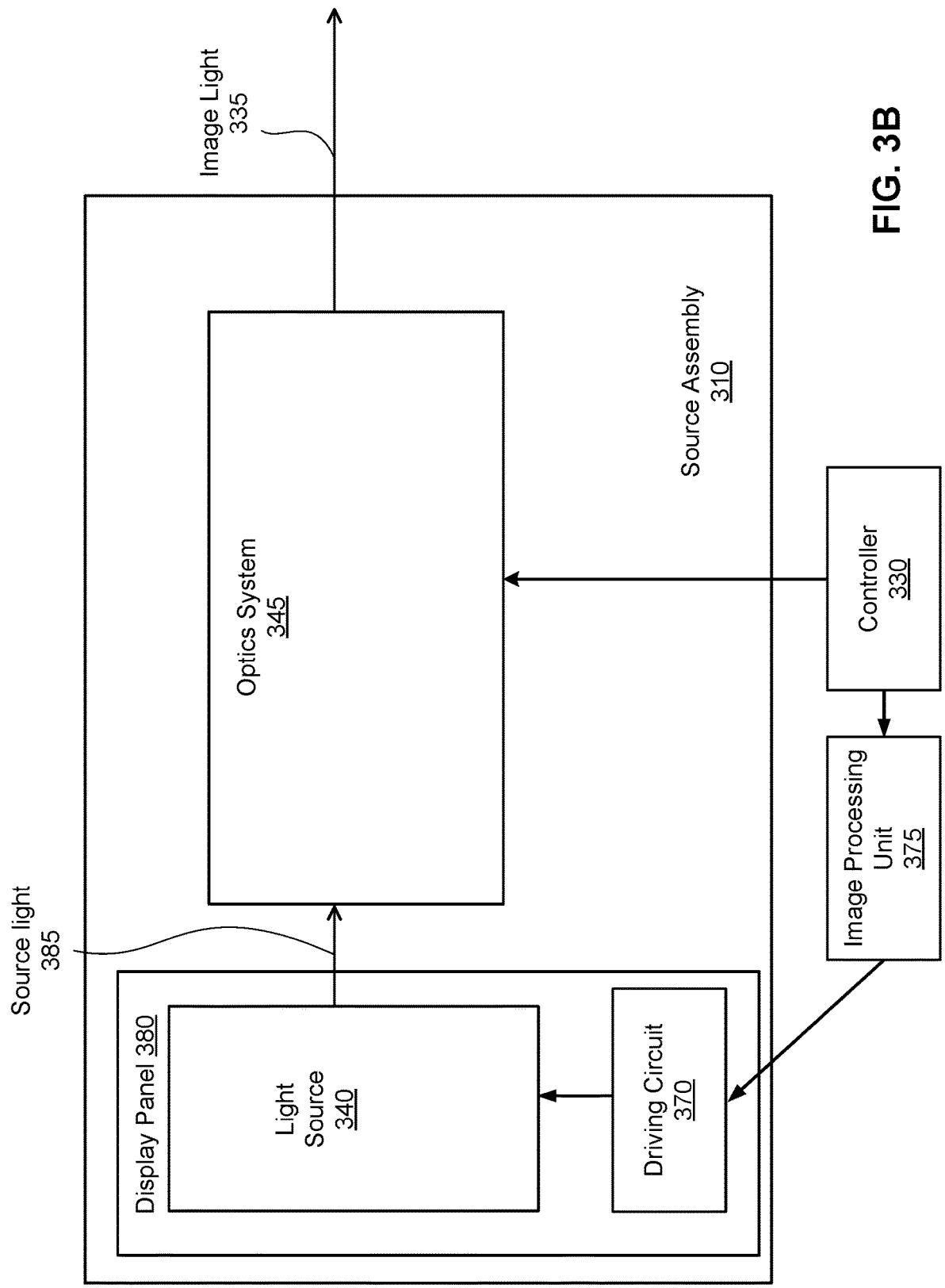
FIG. 3B illustrates a block diagram of a source assembly, in accordance with an embodiment.

FIG. 3B is a block diagram illustrating an example source assembly 310, in accordance with an embodiment. The source assembly 310 includes the light source 340 that emits light that is processed optically by the optics system 345 to generate image light 335 that will be projected on an image field (not shown). The light source 340 is driven by the driving circuit 370 based on the data sent from a controller 330 or an image processing unit 375. In one embodiment, the driving circuit 370 is the circuit panel that connects to and mechanically holds various light emitters of the light source 340. The driving circuit 370 and the light source 340 combined may sometimes be referred to as a display panel 380 or an LED panel (if some forms of LEDs are used as the light emitters).

The light source 340 may generate a spatially coherent or a partially spatially coherent image light. The light source 340 may include multiple light emitters. The light emitters can be vertical cavity surface emitting laser (VCSEL) devices, light emitting diodes (LEDs), microLEDs, tunable lasers, and/or some other light-emitting devices. In one embodiment, the light source 340 includes a matrix of light emitters. In another embodiment, the light source 340 includes multiple sets of light emitters with each set grouped by color and arranged in a matrix form. The light source 340 emits light in a visible band (e.g., from about 390 nm to 700 nm). The light source 340 emits light in accordance with one or more illumination parameters that are set by the controller 330 and potentially adjusted by image processing unit 375 and driving circuit 370. An illumination parameter is an instruction used by the light source 340 to generate light. An illumination parameter may include, e.g., source wavelength, pulse rate, pulse amplitude, beam type (continuous or pulsed), other parameter(s) that affect the emitted light, or some combination thereof. The light source 340 emits source light 385. In some embodiments, the source light 385 includes multiple beams of Red light, Green light, and Blue light, or some combination thereof.

The optics system 345 may include one or more optical components that optically adjust and potentially re-direct the light from the light source 340. One form of example adjustment of light may include conditioning the light. Conditioning the light from the light source 340 may include, e.g., expanding, collimating, correcting for one or more optical errors (e.g., field curvature, chromatic aberration, etc.), some other adjustment of the light, or some combination thereof. The optical components of the optics system 345 may include, e.g., lenses, mirrors, apertures, gratings, or some combination thereof. Light emitted from the optics system 345 is referred to as an image light 355.

The optics system 345 may redirect image light via its one or more reflective and/or refractive portions so that the image light 355 is projected at a particular orientation toward the output waveguide 320 (shown in FIG. 3A). Where the image light is redirected toward is based on specific orientations of the one or more reflective and/or refractive portions. In some embodiments, the optics system 345 includes a single scanning mirror that scans in at least two dimensions. In other embodiments, the optics system 345 may include a plurality of scanning mirrors that each scan in orthogonal directions to each other. The optics system 345 may perform a raster scan (horizontally, or vertically), a biresonant scan, or some combination thereof. In some embodiments, the optics system 345 may perform a controlled vibration along the horizontal and/or vertical directions with a specific frequency of oscillation to scan along two dimensions and generate a two-dimensional projected line image of the media presented to user's eyes. In other embodiments, the optics system 345 may also include a lens that serves similar or same function as one or more scanning mirror.

In some embodiments, the optics system 345 includes a galvanometer mirror. For example, the galvanometer mirror may represent any electromechanical instrument that indicates that it has sensed an electric current by deflecting a beam of image light with one or more mirrors. The galvanometer mirror may scan in at least one orthogonal dimension to generate the image light 355. The image light 355 from the galvanometer mirror represents a two-dimensional line image of the media presented to the user's eyes.

In some embodiments, the source assembly 310 does not include an optics system. The light emitted by the light source 340 is projected directly to the waveguide 320 (shown in FIG. 3A).

The controller 330 controls the operations of light source 340 and, in some cases, the optics system 345. In some embodiments, the controller 330 may be the graphics processing unit (GPU) of a display device. In other embodiments, the controller 330 may be other kinds of processors. The operations performed by the controller 330 includes taking content for display, and dividing the content into discrete sections. The controller 330 instructs the light source 340 to sequentially present the discrete sections using light emitters corresponding to a respective row in an image ultimately displayed to the user. The controller 330 instructs the optics system 345 to perform different adjustment of the light. For example, the controller 330 controls the optics system 345 to scan the presented discrete sections to different areas of a coupling element of the output waveguide 320 (shown in FIG. 3A). Accordingly, at the exit pupil of the output waveguide 320, each discrete portion is presented in a different location. While each discrete section is presented at different times, the presentation and scanning of the discrete sections occur fast enough such that a user's eye integrates the different sections into a single image or series of images. The controller 330 may also provide scanning instructions to the light source 340 that include an address corresponding to an individual source element of the light source 340 and/or an electrical bias applied to the individual source element.

The image processing unit 375 may be a general-purpose processor and/or one or more application-specific circuits that are dedicated to performing the features described herein. In one embodiment, a general-purpose processor may be coupled to a memory to execute software instructions that cause the processor to perform certain processes described herein. In another embodiment, the image processing unit 375 may be one or more circuits that are dedicated to performing certain features. While in FIG. 3B the image processing unit 375 is shown as a stand-alone unit that is separate from the controller 330 and the driving circuit 370, in other embodiments the image processing unit 375 may be a sub-unit of the controller 330 or the driving circuit 370. In other words, in those embodiments, the controller 330 or the driving circuit 370 performs various image processing procedures of the image processing unit 375. The image processing unit 375 may also be referred to as an image processing circuit.

Light Emitters

FIGS. 4A through 4E are conceptual diagrams that illustrate different light emitters' structure and arrangement, in accordance with various embodiments.

Figure 4A:
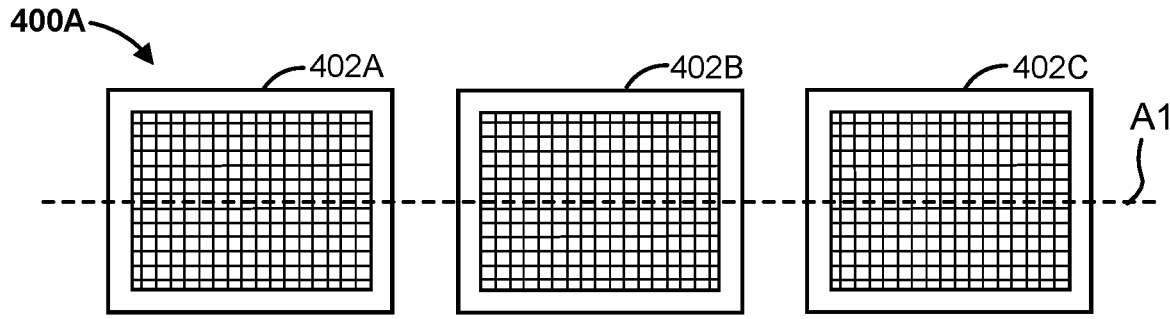
FIGS. 4A, 4B, and 4C are conceptual diagrams representing different arrangements of light emitters, in accordance with some embodiments.
Figure 4B:
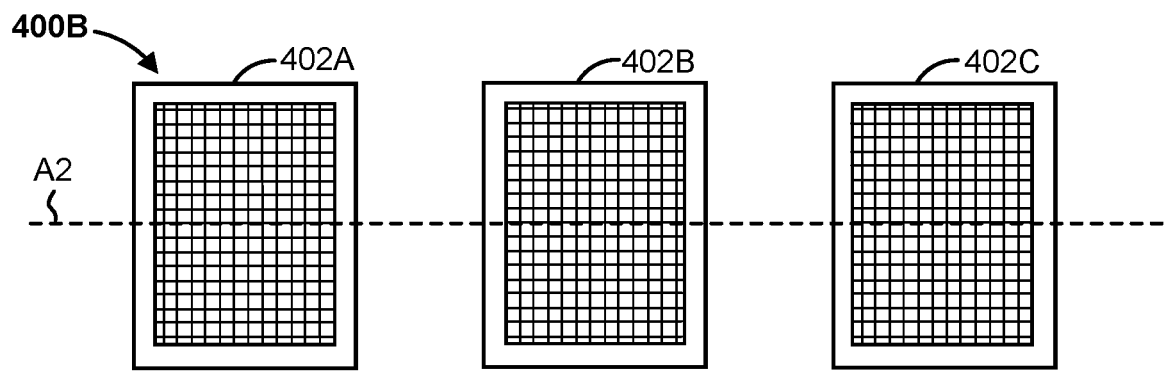
Figure 4C:
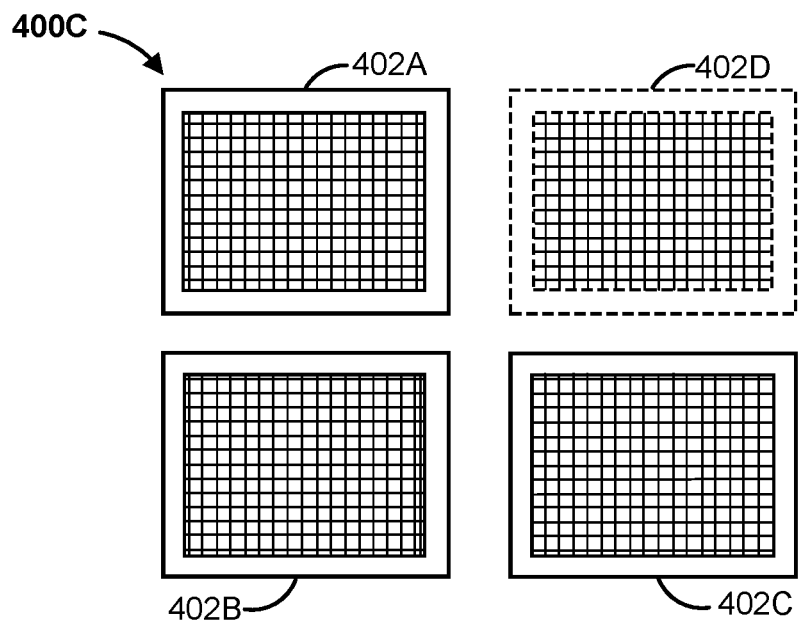

FIGS. 4A, 4B, and 4C are top views of matrix arrangement of light emitters' that may be included in the light source 340 of FIGS. 3A and 3B, in accordance to some embodiments. The configuration 400A shown in FIG. 4A is a linear configuration of the light emitter arrays 402A-C of FIG. 4A along the axis A1. This particular linear configuration may be arranged according to a longer side of the rectangular light emitter arrays 402. While the light emitter arrays 402 may have a square configuration of light emitters in some embodiments, other embodiments may include a rectangular configuration of light emitters. The light emitter arrays 402A-C each include multiple rows and columns of light emitters. Each light emitter array 402A-C may include light emitters of a single color. For example, light emitter array 402A may include red light emitters, light emitter array 402B may include green light emitters, and light emitter array 402C may include blue light emitters. In other embodiments, the light emitter arrays 402A-C may have other configurations (e.g., oval, circular, or otherwise rounded in some fashion) while defining a first dimension (e.g., a width) and a second dimension (e.g., length) orthogonal to the first direction, with one dimension being either equal or unequal to each other. In FIG. 4B, the light emitter arrays 402A-C may be disposed in a linear configuration 400B according to a shorter side of the rectangular light emitter arrays 402, along an axis A2. FIG. 4C shows a triangular configuration of the light emitter arrays 402A-C in which the centers of the light emitter arrays 402 form a non-linear (e.g., triangular) shape or configuration. Some embodiments of the configuration 400C of FIG. 4C may further include a white-light emitter array 402D, such that the light emitter arrays 402 are in a rectangular or square configuration. The light emitter arrays 402 may have a two-dimensional light emitter configuration with more than 1000 by 1000 light emitters, in some embodiments. Various other configurations are also within the scope of the present disclosure.

While the matrix arrangements of light emitters shown in FIGS. 4A-4C are arranged in perpendicular rows and columns, in other embodiments the matrix arrangements may be arranged other forms. For example, some of the light emitters may be aligned diagonally or in other arrangements, regular or irregular, symmetrical or asymmetrical. Also, the terms rows and columns may describe two relative spatial relationships of elements. While, for the purpose of simplicity, a column described herein is normally associated with a vertical line of elements, it should be understood that a column does not have to be arranged vertically (or longitudinally). Likewise, a row does not have to be arranged horizontally (or laterally). A row and a column may also sometimes describe an arrangement that is non-linear. Rows and columns also do not necessarily imply any parallel or perpendicular arrangement. Sometimes a row or a column may be referred to as a line. Also, in some embodiments, the light emitters may not be arranged in a matrix configuration. For example, in some display devices that include a rotating mirror that will be discussed in further details in FIG. 5A, there may be a single line of light emitters for each color. In other embodiments, there may be two or three lines of light emitters for each color.

Figure 4D:
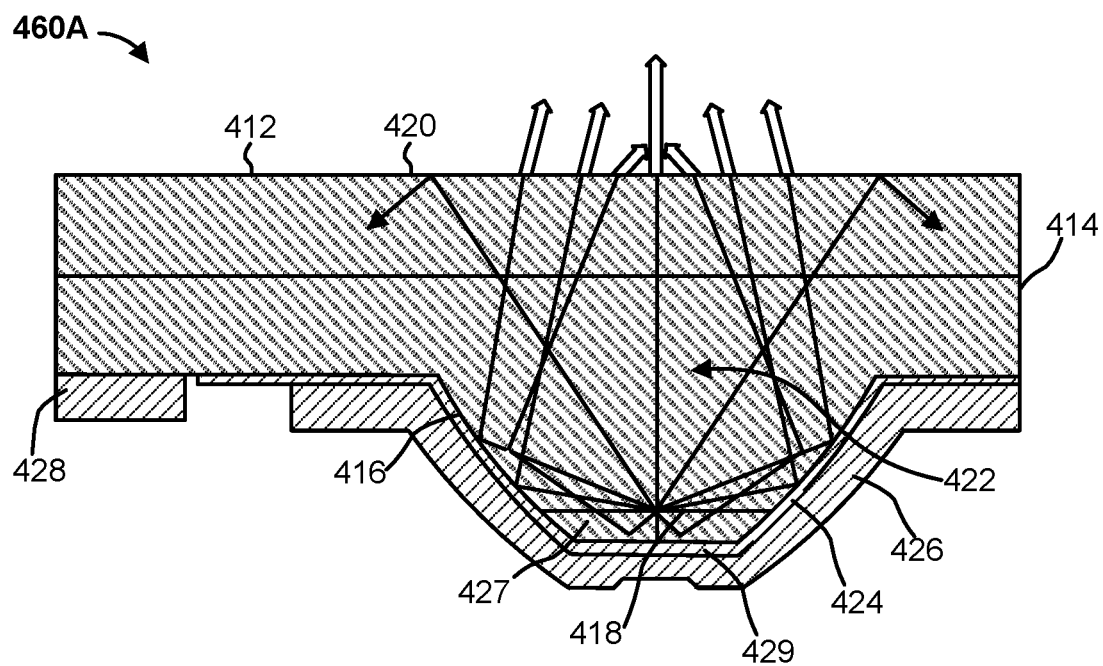
FIGS. 4D and 4E are schematic cross-sectional diagrams of light emitters, in accordance with some embodiments.
Figure 4E:
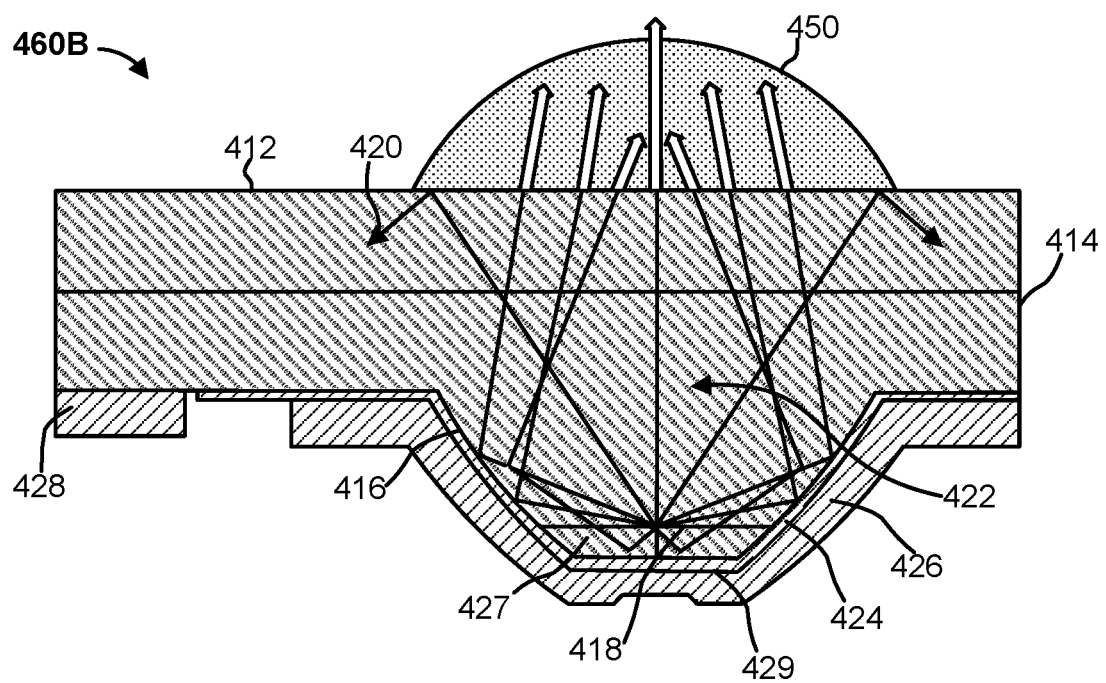

FIGS. 4D and 4E are schematic cross-sectional diagrams of an example of light emitters 410 that may be used as an individual light emitter in the light emitter arrays 402 of FIGS. 4A-C, in accordance with some embodiments. In one embodiment, the light emitter 410 may be microLED 460A. In other embodiments, other types of light emitters may be used. FIG. 4D shows a schematic cross-section of a microLED 460A. A "microLED" may be a particular type of LED having a small active light emitting area (e.g., less than 2,000 $\mu m^2$ in some embodiments, less than 20 $\mu m^2$ or less than 10 $\mu m^2$ in other embodiments). In some embodiments, the emissive surface of the microLED 460A may have a diameter of less than approximately 5 µm, although smaller (e.g., 2 µm) or larger diameters for the emissive surface may be utilized in other embodiments. The microLED 460A may also have collimated or non-Lambertian light output, in some examples, which may increase the brightness level of light emitted from a small active light-emitting area.

The microLED 460A may include, among other components, an LED substrate 412 with a semiconductor epitaxial layer 414 disposed on the substrate 412, a dielectric layer 424 and a p-contact 429 disposed on the epitaxial layer 414, a metal reflector layer 426 disposed on the dielectric layer 424 and p-contact 429, and an n-contact 428 disposed on the epitaxial layer 414. The epitaxial layer 414 may be shaped into a mesa 416. An active light-emitting area 418 may be formed in the structure of the mesa 416 by way of a p-doped region 427 of the epitaxial layer 414.

The substrate 412 may include transparent materials such as sapphire or glass. In one embodiment, the substrate 412 may include silicon, silicon oxide, silicon dioxide, aluminum oxide, sapphire, an alloy of silicon and germanium, indium phosphide (InP), and the like. In some embodiments, the substrate 412 may include a semiconductor material (e.g., monocrystalline silicon, germanium, silicon germanium (SiGe), and/or a III-V based material (e.g., gallium arsenide), or any combination thereof. In various embodiments, the substrate 412 can include a polymer-based substrate, glass, or any other bendable substrate including two-dimensional materials (e.g., graphene and molybdenum disulfide), organic materials (e.g., pentacene), transparent oxides (e.g., indium gallium zinc oxide (IGZO)), polycrystalline III-V materials, polycrystalline germanium, polycrystalline silicon, amorphous III-V materials, amorphous germanium, amorphous silicon, or any combination thereof. In some embodiments, the substrate 412 may include a III-V compound semiconductor of the same type as the active LED (e.g., gallium nitride). In other examples, the substrate 412 may include a material having a lattice constant close to that of the epitaxial layer 414.

The epitaxial layer 414 may include gallium nitride (GaN) or gallium arsenide (GaAs). The active layer 418 may include indium gallium nitride (InGaN). The type and structure of semiconductor material used may vary to produce microLEDs that emit specific colors. In one embodiment, the semiconductor materials used can include a III-V semiconductor material. III-V semiconductor material layers can include those materials that are formed by combining group III elements (Al, Ga, In, etc.) with group V elements (N, P, As, Sb, etc.). The p-contact 429 and n-contact 428 may be contact layers formed from indium tin oxide (ITO) or another conductive material that can be transparent at the desired thickness or arrayed in a grid-like pattern to provide for both good optical transmission/transparency and electrical contact, which may result in the microLED 460A also being transparent or substantially transparent. In such examples, the metal reflector layer 426 may be omitted. In other embodiments, the p-contact 429 and the n-contact 428 may include contact layers formed from conductive material (e.g., metals) that may not be optically transmissive or transparent, depending on pixel design.

In some implementations, alternatives to ITO can be used, including wider-spectrum transparent conductive oxides (TCOs), conductive polymers, metal grids, carbon nanotubes (CNT), graphene, nanowire meshes, and thin-metal films. Additional TCOs can include doped binary compounds, such as aluminum-doped zinc-oxide (AZO) and indium-doped cadmium-oxide. Additional TCOs may include barium stannate and metal oxides, such as strontium vanadate and calcium vanadate. In some implementations, conductive polymers can be used. For example, a poly(3,4-ethylenedioxythiophene) PEDOT: poly(styrene sulfonate) PSS layer can be used. In another example, a poly(4,4-dioctyl cyclopentadithiophene) material doped with iodine or 2,3-dichloro-5,6-dicyano-1,4-benzoquinone (DDQ) can be used. The example polymers and similar materials can be spin-coated in some example embodiments.

In some embodiments, the p-contact 429 may be of a material that forms an ohmic contact with the p-doped region 427 of the mesa 416. Examiner of such materials may include, but are not limited to, palladium, nickel oxide deposited as a NiAu multilayer coating with subsequent oxidation and annealing, silver, nickel oxide/silver, gold/zinc, platinum gold, or other combinations that form ohmic contacts with p-doped III-V semiconductor material.

The mesa 416 of the epitaxial layer 414 may have a truncated top on a side opposed to a substrate light emissive surface 420 of the substrate 412. The mesa 416 may also have a parabolic or near-parabolic shape to form a reflective enclosure or parabolic reflector for light generated within the microLED 460A. However, while FIG. 4D depicts a parabolic or near-parabolic shape for the mesa 416, other shapes for the mesa 416 are possible in other embodiments. The arrows indicate how light 422 emitted from the active layer 418 may be reflected off the internal walls of the mesa 416 toward the light emissive surface 420 at an angle sufficient for the light to escape the microLED 460A (i.e., outside an angle of total internal reflection). The p-contact 429 and the n-contact 428 may electrically connect the microLED 460A to a substrate.

The parabolic-shaped structure of the microLED 460A may result in an increase in the extraction efficiency of the microLED 460A into low illumination angles when compared to unshaped or standard LEDs. Standard LED dies may generally provide an emission full width at half maximum (FWHM) angle of 120°. In comparison, the microLED 460A can be designed to provide controlled emission angle FWHM of less than standard LED dies, such as around 41°. This increased efficiency and collimated output of the microLED 460A can enable improvement in overall power efficiency of the NED, which can be important for thermal management and/or battery life.

The microLED 460A may include a circular cross-section when cut along a horizontal plane, as shown in FIG. 4D. However, the microLED 460A cross-section may be non-circular in other examples. The microLED 460A may have a parabolic structure etched directly onto the LED die during the wafer processing steps. The parabolic structure may include the active light-emitting area 418 of the microLED 460A to generate light, and the parabolic structure may reflect a portion of the generated light to form the quasi-collimated light 422 emitted from the substrate light emissive surface 420. In some examples, the optical size of the microLED 460A may be smaller than or equal to the active light-emitting area 418. In other embodiments, the optical size of the microLED 460A may be larger than the active light-emitting area 418, such as through a refractive or reflective approach, to improve usable brightness of the microLED 460A, including any chief ray angle (CRA) offsets to be produced by the light emitter array 402.

FIG. 4E depicts a microLED 460B that is similar in many respects to the microLED 460A of FIG. 4D. The microLED 460B may further include a microlens 450, which may be formed over the parabolic structure. In some embodiments, the microlens 450 may be formed by applying a polymer coating over the microLED 460A, patterning the coating, and reflowing the coating to achieve the desired lens curvature. The microlens 450 may be disposed over an emissive surface to alter a chief ray angle of the microLED 460B. In another embodiment, the microlens 450 may be formed by depositing a microlens material above the microLED 460A (for example, by a spin-on method or a deposition process). For example, a microlens template (not shown) having a curved upper surface can be patterned above the microlens material. In some embodiments, the microlens template may include a photoresist material exposed using a distributing exposing light dose (e.g., for a negative photoresist, more light is exposed at a bottom of the curvature and less light is exposed at a top of the curvature), developed, and baked to form a rounding shape. The microlens 450 can then be formed by selectively etching the microlens material according to the microlens template. In some embodiments, the shape of the microlens 450 may be formed by etching into the substrate 412. In other embodiments, other types of light-shaping or light-distributing elements, such as an annular lens, Fresnel lens, or photonic crystal structures, may be used instead of microlenses.

In some embodiments, microLED arrangements other than those specifically discussed above in conjunction with FIGS. 4D and 4E may be employed as a microLED in light emitter array 402. For example, the microLED may include isolated pillars of epitaxially grown light-emitting material surrounded by a metal reflector. The pixels of the light emitter array 402 may also include clusters of small pillars (e.g., nanowires) of epitaxially grown material that may or may not be surrounded by reflecting material or absorbing material to prevent optical crosstalk. In some examples, the microLED pixels may be individual metal p-contacts on a planar, epitaxially grown LED device, in which the individual pixels may be electrically isolated using passivation means, such as plasma treatment, ion-implantation, or the like. Such devices may be fabricated with light extraction enhancement methods, such as microlenses, diffractive structures, or photonic crystals. Other processes for fabricating the microLEDs of the dimensions noted above other than those specifically disclosed herein may be employed in other embodiments.

Formation of an Image

Figure 5A:
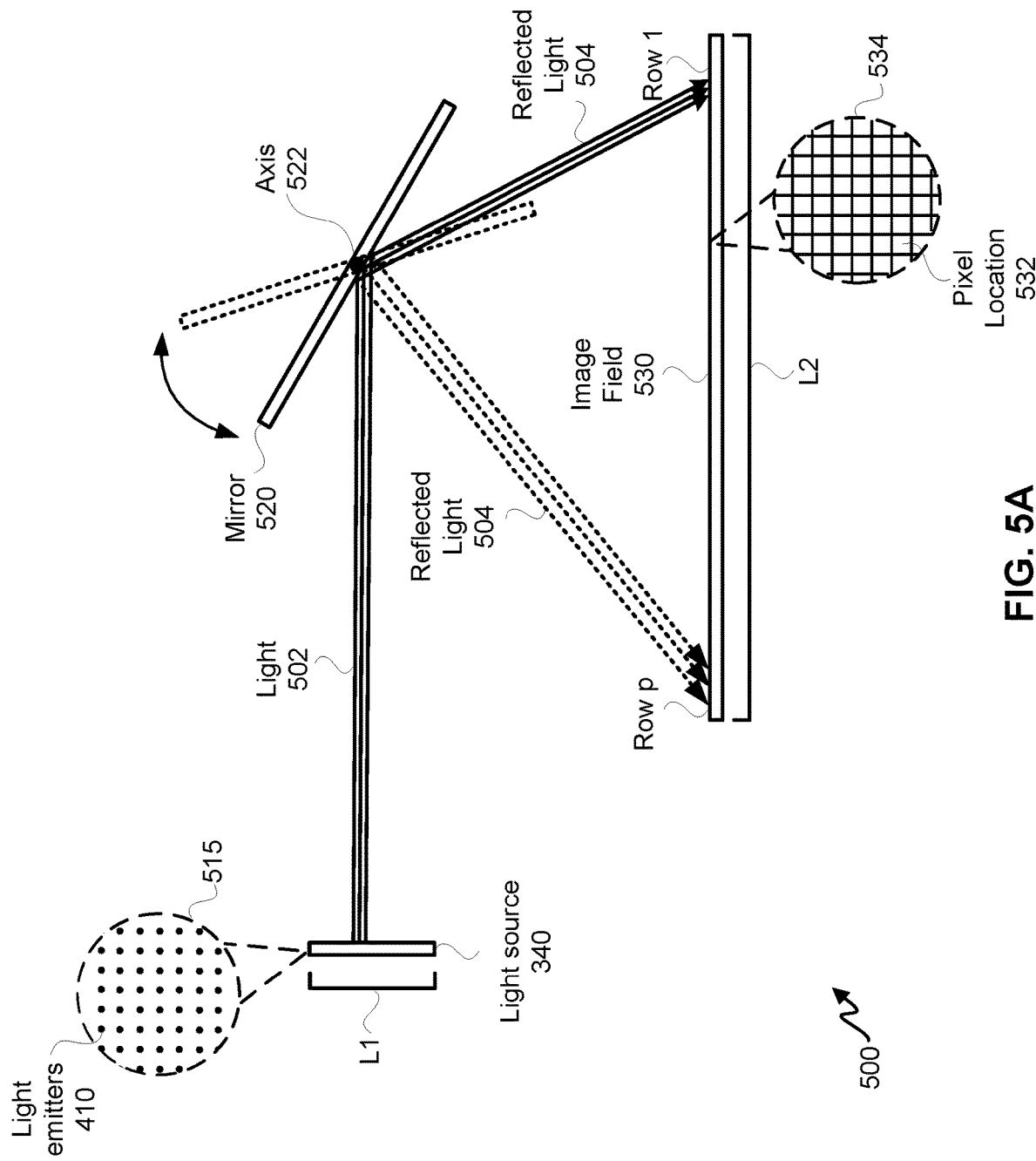
FIG. 5A is a diagram illustrating a scanning operation of a display device using a mirror to project light from a light source to an image field, in accordance with an embodiment.
Figure 5B:
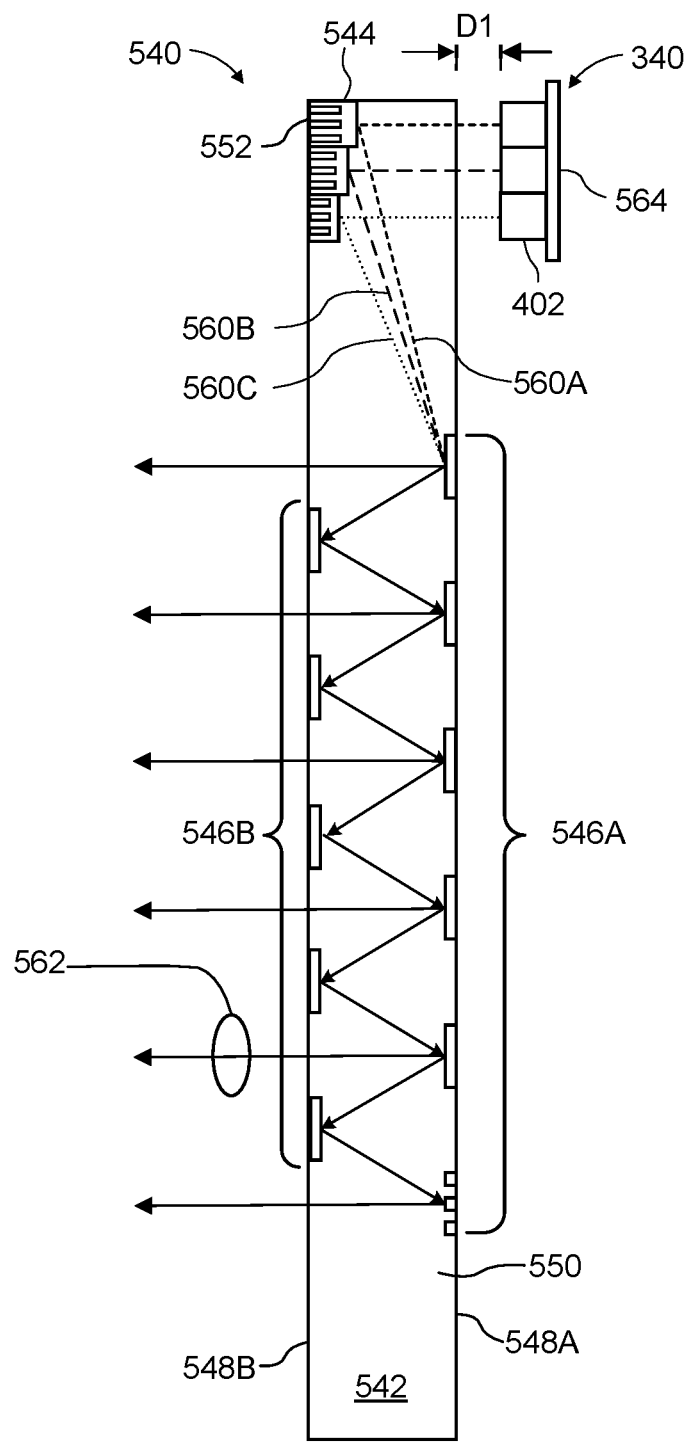
FIG. 5B is a diagram illustrating a waveguide configuration, in accordance with an embodiment.

FIGS. 5A and 5B illustrate how images and pupil replications are formed in a display device based on different structural arrangement of light emitters, in accordance with different embodiments. An image field is an area that receives the light emitted by the light source and forms an image. For example, an image field may correspond to a portion of the coupling element 350 or a portion of the decoupling element 360 in FIG. 3A. In some cases, an image field is not an actual physical structure but is an area to which the image light is projected and which the image is formed. In one embodiment, the image field is a surface of the coupling element 350 and the image formed on the image field is magnified as light travels through the output waveguide 320. In another embodiment, an image field is formed after light passing through the waveguide which combines the light of different colors to form the image field. In some embodiments, the image field may be projected directly into the user's eyes.

FIG. 5A is a diagram illustrating a scanning operation of a display device 500 using a scanning mirror 520 to project light from a light source 340 to an image field 530, in accordance with an embodiment. The display device 500 may correspond to the near-eye display 100 or another scan-type display device. The light source 340 may correspond to the light source 340 shown in FIG. 3B, or may be used in other display devices. The light source 340 includes multiple rows and columns of light emitters 410, as represented by the dots in inset 515. In one embodiment, the light source 340 may include a single line of light emitters 410 for each color. In other embodiments, the light source 340 may include more than one lines of light emitters 410 for each color. The light 502 emitted by the light source 340 may be a set of collimated beams of light. For example, the light 502 in FIG. 5 shows multiple beams that are emitted by a column of light emitters 410. Before reaching the mirror 520, the light 502 may be conditioned by different optical devices such as the conditioning assembly 430 (shown in FIG. 3B but not shown in FIG. 5). The mirror 520 reflects and projects the light 502 from the light source 340 to the image field 530. The mirror 520 rotates about an axis 522. The mirror 520 may be a microelectromechanical system (MEMS) mirror or any other suitable mirror. The mirror 520 may be an embodiment of the optics system 345 in FIG. 3B or a part of the optics system 345. As the mirror 520 rotates, the light 502 is directed to a different part of the image field 530, as illustrated by the reflected part of the light 504 in solid lines and the reflected part of the light 504 in dash lines.

At a particular orientation of the mirror 520 (i.e., a particular rotational angle), the light emitters 410 illuminate a portion of the image field 530 (e.g., a particular subset of multiple pixel locations 532 on the image field 530). In one embodiment, the light emitters 410 are arranged and spaced such that a light beam from each light emitter 410 is projected on a corresponding pixel location 532. In another embodiment, small light emitters such as microLEDs are used for light emitters 410 so that light beams from a subset of multiple light emitters are together projected at the same pixel location 532. In other words, a subset of multiple light emitters 410 collectively illuminates a single pixel location 532 at a time.

The image field 530 may also be referred to as a scan field because, when the light 502 is projected to an area of the image field 530, the area of the image field 530 is being illuminated by the light 502. The image field 530 may be spatially defined by a matrix of pixel locations 532 (represented by the blocks in inset 534) in rows and columns. A pixel location here refers to a single pixel. The pixel locations 532 (or simply the pixels) in the image field 530 sometimes may not actually be additional physical structure. Instead, the pixel locations 532 may be spatial regions that divide the image field 530. Also, the sizes and locations of the pixel locations 532 may depend on the projection of the light 502 from the light source 340. For example, at a given angle of rotation of the mirror 520, light beams emitted from the light source 340 may fall on an area of the image field 530. As such, the sizes and locations of pixel locations 532 of the image field 530 may be defined based on the location of each light beam. In some cases, a pixel location 532 may be subdivided spatially into subpixels (not shown). For example, a pixel location 532 may include a Red subpixel, a Green subpixel, and a Blue subpixel. The Red subpixel corresponds to a location at which one or more Red light beams are projected, etc. When subpixels are present, the color of a pixel 532 is based on the temporal and/or spatial average of the subpixels.

The number of rows and columns of light emitters 410 of the light source 340 may or may not be the same as the number of rows and columns of the pixel locations 532 in the image field 530. In one embodiment, the number of light emitters 410 in a row is equal to the number of pixel locations 532 in a row of the image field 530 while the number of light emitters 410 in a column is two or more but fewer than the number of pixel locations 532 in a column of the image field 530. Put differently, in such embodiment, the light source 340 has the same number of columns of light emitters 410 as the number of columns of pixel locations 532 in the image field 530 but has fewer rows than the image field 530. For example, in one specific embodiment, the light source 340 has about 1280 columns of light emitters 410, which is the same as the number of columns of pixel locations 532 of the image field 530, but only a handful of light emitters 410. The light source 340 may have a first length L1, which is measured from the first row to the last row of light emitters 410. The image field 530 has a second length L2, which is measured from row 1 to row p of the scan field 530. In one embodiment, L2 is greater than L1 (e.g., L2 is 50 to 10,000 times greater than L1).

Since the number of rows of pixel locations 532 is larger than the number of rows of light emitters 410 in some embodiments, the display device 500 uses the mirror 520 to project the light 502 to different rows of pixels at different times. As the mirror 520 rotates and the light 502 scans through the image field 530 quickly, an image is formed on the image field 530. In some embodiments, the light source 340 also has a smaller number of columns than the image field 530. The mirror 520 can rotate in two dimensions to fill the image field 530 with light (e.g., a raster-type scanning down rows then moving to new columns in the image field 530).

The display device may operate in predefined display periods. A display period may correspond to a duration of time in which an image is formed. For example, a display period may be associated with the frame rate (e.g., a reciprocal of the frame rate). In the particular embodiment of display device 500 that includes a rotating mirror, the display period may also be referred to as a scanning period. A complete cycle of rotation of the mirror 520 may be referred to as a scanning period. A scanning period herein refers to a predetermined cycle time during which the entire image field 530 is completely scanned. The scanning of the image field 530 is controlled by the mirror 520. The light generation of the display device 500 may be synchronized with the rotation of the mirror 520. For example, in one embodiment, the movement of the mirror 520 from an initial position that projects light to row 1 of the image field 530, to the last position that projects light to row p of the image field 530, and then back to the initial position is equal to a scanning period. The scanning period may also be related to the frame rate of the display device 500. By completing a scanning period, an image (e.g., a frame) is formed on the image field 530 per scanning period. Hence, the frame rate may correspond to the number of scanning periods in a second.

As the mirror 520 rotates, light scans through the image field and images are formed. The actual color value and light intensity (brightness) of a given pixel location 532 may be an average of the color various light beams illuminating the pixel location during the scanning period. After completing a scanning period, the mirror 520 reverts back to the initial position to project light onto the first few rows of the image field 530 again, except that a new set of driving signals may be fed to the light emitters 410. The same process may be repeated as the mirror 520 rotates in cycles. As such, different images are formed in the scanning field 530 in different frames.

FIG. 5B is a conceptual diagram illustrating a waveguide configuration to form an image and replications of images that may be referred to as pupil replications, in accordance with an embodiment. In this embodiment, the light source of the display device may be separated into three different light emitter arrays 402, such as based on the configurations shown in FIGS. 4A and 4B. The primary colors may be red, green, and blue or another combination of other suitable primary colors. In one embodiment, the number of light emitters in each light emitter array 402 may be equal to the number of pixel locations an image field (not shown in FIG. 5B). As such, contrary to the embodiment shown in FIG. 5A that uses a scanning operation, each light emitter may be dedicated to generating images at a pixel location of the image field. In another embodiment, the configuration shown in FIGS. 5A and 5B may be combined. For example, the configuration shown in FIG. 5B may be located downstream of the configuration shown in FIG. 5A so that the image formed by the scanning operation in FIG. 5A may further be replicated to generate multiple replications.

The embodiments depicted in FIG. 5B may provide for the projection of many image replications (e.g., pupil replications) or decoupling a single image projection at a single point. Accordingly, additional embodiments of disclosed NEDs may provide for a single decoupling element. Outputting a single image toward the eyebox 230 may preserve the intensity of the coupled image light. Some embodiments that provide for decoupling at a single point may further provide for steering of the output image light. Such pupil-steering NEDs may further include systems for eye tracking to monitor a user's gaze. Some embodiments of the waveguide configurations that provide for pupil replication, as described herein, may provide for one-dimensional replication, while other embodiments may provide for two-dimensional replication. For simplicity, one-dimensional pupil replication is shown in FIG. 5B. Two-dimensional pupil replication may include directing light into and outside the plane of FIG. 5B. FIG. 5B is presented in a simplified format. The detected gaze of the user may be used to adjust the position and/or orientation of the light emitter arrays 402 individually or the light source 340 as a whole and/or to adjust the position and/or orientation of the waveguide configuration.

In FIG. 5B, a waveguide configuration 540 is disposed in cooperation with a light source 340, which may include one or more monochromatic light emitter arrays 402 secured to a support structure 564 (e.g., a printed circuit board or another structure). The support structure 564 may be coupled to the frame 105 of FIG. 1. The waveguide configuration 540 may be separated from the light source 340 by an air gap having a distance D1. The distance D1 may be in a range from approximately 50 µm to approximately 500 µm in some examples. The monochromatic image or images projected from the light source 340 may pass through the air gap toward the waveguide configuration 540. Any of the light source embodiments described herein may be utilized as the light source 340.

The waveguide configuration may include a waveguide 542, which may be formed from a glass or plastic material. The waveguide 542 may include a coupling area 544 and a decoupling area formed by decoupling elements 546A on a top surface 548A and decoupling elements 546B on a bottom surface 548B in some embodiments. The area within the waveguide 542 in between the decoupling elements 546A and 546B may be considered a propagation area 550, in which light images received from the light source 340 and coupled into the waveguide 542 by coupling elements included in the coupling area 544 may propagate laterally within the waveguide 542.

The coupling area 544 may include a coupling element 552 configured and dimensioned to couple light of a predetermined wavelength, e.g., red, green, or blue light. When a white light emitter array is included in the light source 340, the portion of the white light that falls in the predetermined wavelength may be coupled by each of the coupling elements 552. In some embodiments, the coupling elements 552 may be gratings, such as Bragg gratings, dimensioned to couple a predetermined wavelength of light. In some examples, the gratings of each coupling element 552 may exhibit a separation distance between gratings associated with the predetermined wavelength of light that the particular coupling element 552 is to couple into the waveguide 542, resulting in different grating separation distances for each coupling element 552. Accordingly, each coupling element 552 may couple a limited portion of the white light from the white light emitter array when included. In other examples, the grating separation distance may be the same for each coupling element 552. In some examples, coupling element 552 may be or include a multiplexed coupler.

As shown in FIG. 5B, a red image 560A, a blue image 560B, and a green image 560C may be coupled by the coupling elements of the coupling area 544 into the propagation area 550 and may begin traversing laterally within the waveguide 542. In one embodiment, the red image 560A, the blue image 560B, and the green image 560C, each represented by a different dash line in FIG. 5B, may converge to form an overall image that is represented by a solid line. For simplicity, FIG. 5B may show an image by a single arrow, but each arrow may represent an image field where the image is formed. In another embodiment, red image 560A, the blue image 560B, and the green image 560C, may correspond to different spatial locations.

A portion of the light may be projected out of the waveguide 542 after the light contacts the decoupling element 546A for one-dimensional pupil replication, and after the light contacts both the decoupling element 546A and the decoupling element 546B for two-dimensional pupil replication. In two-dimensional pupil replication embodiments, the light may be projected out of the waveguide 542 at locations where the pattern of the decoupling element 546A intersects the pattern of the decoupling element 546B.

The portion of light that is not projected out of the waveguide 542 by the decoupling element 546A may be reflected off the decoupling element 546B. The decoupling element 546B may reflect all incident light back toward the decoupling element 546A, as depicted. Accordingly, the waveguide 542 may combine the red image 560A, the blue image 560B, and the green image 560C into a polychromatic image instance, which may be referred to as a pupil replication 562. The polychromatic pupil replication 562 may be projected toward the eyebox 230 of FIG. 2 and to the eye 220, which may interpret the pupil replication 562 as a full-color image (e.g., an image including colors in addition to red, green, and blue). The waveguide 542 may produce tens or hundreds of pupil replications 562 or may produce a single replication 562.

In some embodiments, the waveguide configuration may differ from the configuration shown in FIG. 5B. For example, the coupling area may be different. Rather than including gratings as coupling element 552, an alternate embodiment may include a prism that reflects and refracts received image light, directing it toward the decoupling element 706A. Also, while FIG. 5B generally shows the light source 340 having multiple light emitters arrays 402 coupled to the same support structure 564, other embodiments may employ a light source 340 with separate monochromatic emitters arrays 402 located at disparate locations about the waveguide configuration (e.g., one or more emitters arrays 402 located near a top surface of the waveguide configuration and one or more emitters arrays 402 located near a bottom surface of the waveguide configuration).

Also, although only three light emitter arrays are shown in FIG. 5B, an embodiment may include more or fewer light emitter arrays. For example, in one embodiment, a display device may include two red arrays, two green arrays, and two blue arrays. In one case, the extra set of emitter panels provides redundant light emitters for the same pixel location. In another case, one set of red, green, and blue panels is responsible for generating light corresponding to the most significant bits of a color dataset for a pixel location while another set of panels is responsible for generating light corresponding the least significant bits of the color dataset. The separation of most and least significant bits of a color dataset will be discussed in further detail below in FIG. 6.

While FIGS. 5A and 5B show different ways an image may be formed in a display device, the configurations shown in FIGS. 5A and 5B are not mutually exclusive. For example, in one embodiment, a display device may use both a rotating mirror and a waveguide to form an image and also to form multiple pupil replications.

Figure 5C:
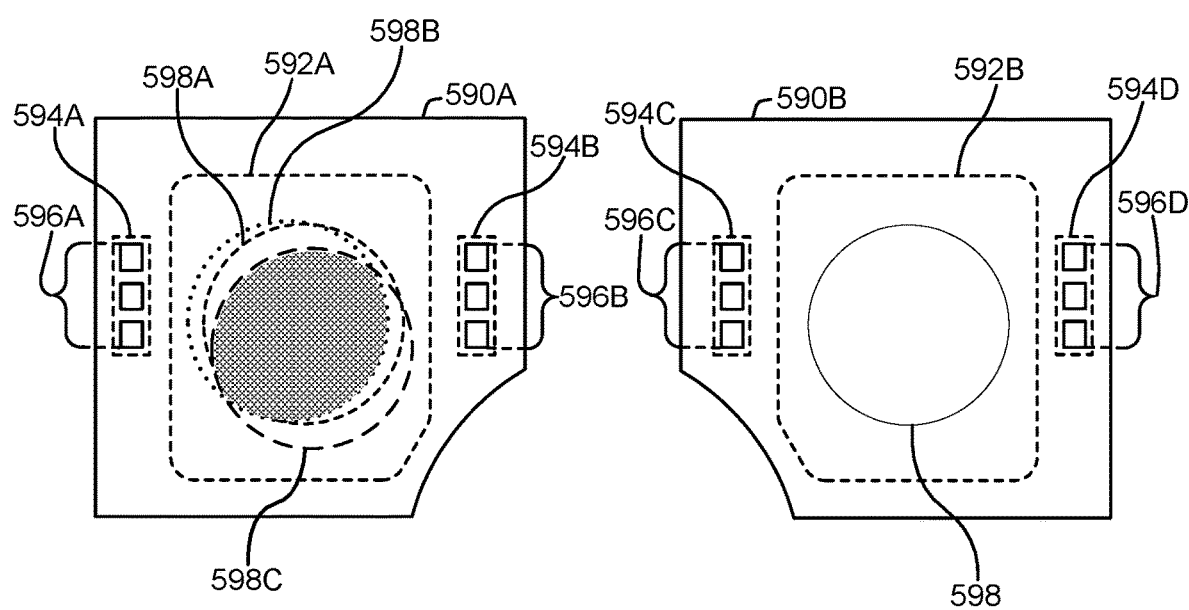
FIG. 5C is a top view of display device, in accordance with an embodiment.

FIG. 5C is a top view of a display system (e.g., an NED), in accordance with an embodiment. The NED 570 in FIG. 9A may include a pair of waveguide configurations. Each waveguide configuration projects images to an eye of a user. In some embodiments not shown in FIG. 5C, a single waveguide configuration that is sufficiently wide to project images to both eyes may be used. The waveguide configurations 590A and 590B may each include a decoupling area 592A or 592B. In order to provide images to an eye of the user through the waveguide configuration 590, multiple coupling areas 594 may be provided in a top surface of the waveguide of the waveguide configuration 590. The coupling areas 594A and 594B may include multiple coupling elements to interface with light images provided by a light emitter array set 596A and a light emitter array set 596B, respectively. Each of the light emitter array sets 596 may include a plurality of monochromatic light emitter arrays, as described herein. As shown, the light emitter array sets 596 may each include a red light emitter array, a green light emitter array, and a blue light emitter array. As described herein, some light emitter array sets may further include a white light emitter array or a light emitter array emitting some other color or combination of colors.

The right eye waveguide 590A may include one or more coupling areas 594A, 594B, 594C, and 594D (all or a portion of which may be referred to collectively as coupling areas 594) and a corresponding number of light emitter array sets 596A, 596B, 596C, and 596D (all or a portion of which may be referred to collectively as the light emitter array sets 596). Accordingly, while the depicted embodiment of the right eye waveguide 590A may include two coupling areas 594 and two light emitter array sets 596, other embodiments may include more or fewer. In some embodiments, the individual light emitter arrays of a light emitter array set may be disposed at different locations around a decoupling area. For example, the light emitter array set 596A may include a red light emitter array disposed along a left side of the decoupling area 592A, a green light emitter array disposed along the top side of the decoupling area 592A, and a blue light emitter array disposed along the right side of the decoupling area 592A. Accordingly, light emitter arrays of a light emitter array set may be disposed all together, in pairs, or individually, relative to a decoupling area.

The left eye waveguide 590B may include the same number and configuration of coupling areas 594 and light emitter array sets 596 as the right eye waveguide 590A, in some embodiments. In other embodiments, the left eye waveguide 590B and the right eye waveguide 590A may include different numbers and configurations (e.g., positions and orientations) of coupling areas 594 and light emitter array sets 596. Included in the depiction of the left waveguide 590A and the right waveguide 590B are different possible arrangements of pupil replication areas of the individual light emitter arrays included in one light emitter array set 596. In one embodiment, the pupil replication areas formed from different color light emitters may occupy different areas, as shown in the left waveguide 590A. For example, a red light emitter array of the light emitter array set 596 may produce pupil replications of a red image within the limited area 598A. A green light emitter array may produce pupil replications of a green image within the limited area 598B. A blue light emitter array may produce pupil replications of a blue image within the limited area 598C. Because the limited areas 598 may be different from one monochromatic light emitter array to another, only the overlapping portions of the limited areas 598 may be able to provide full-color pupil replication, projected toward the eyebox 230. In another embodiment, the pupil replication areas formed from different color light emitters may occupy the same space, as represented by a single solid-lined circle 598 in the right waveguide 590B.

In one embodiment, waveguide portions 590A and 590B may be connected by a bridge waveguide (not shown). The bridge waveguide may permit light from the light emitter array set 596A to propagate from the waveguide portion 590A into the waveguide portion 590B. Similarly, the bridge waveguide may permit light emitted from the light emitter array set 596B to propagate from the waveguide portion 590B into the waveguide portion 590A. In some embodiments, the bridge waveguide portion may not include any decoupling elements, such that all light totally internally reflects within the waveguide portion. In other embodiments, the bridge waveguide portion 590C may include a decoupling area. In some embodiments, the bridge waveguide may be used to obtain light from both waveguide portions 590A and 590B and couple the obtained light to a detector (e.g. a photodetector), such as to detect image misalignment between the waveguide portions 590A and 590B.

Hybrid Pulse Width Modulation

Figure 6:
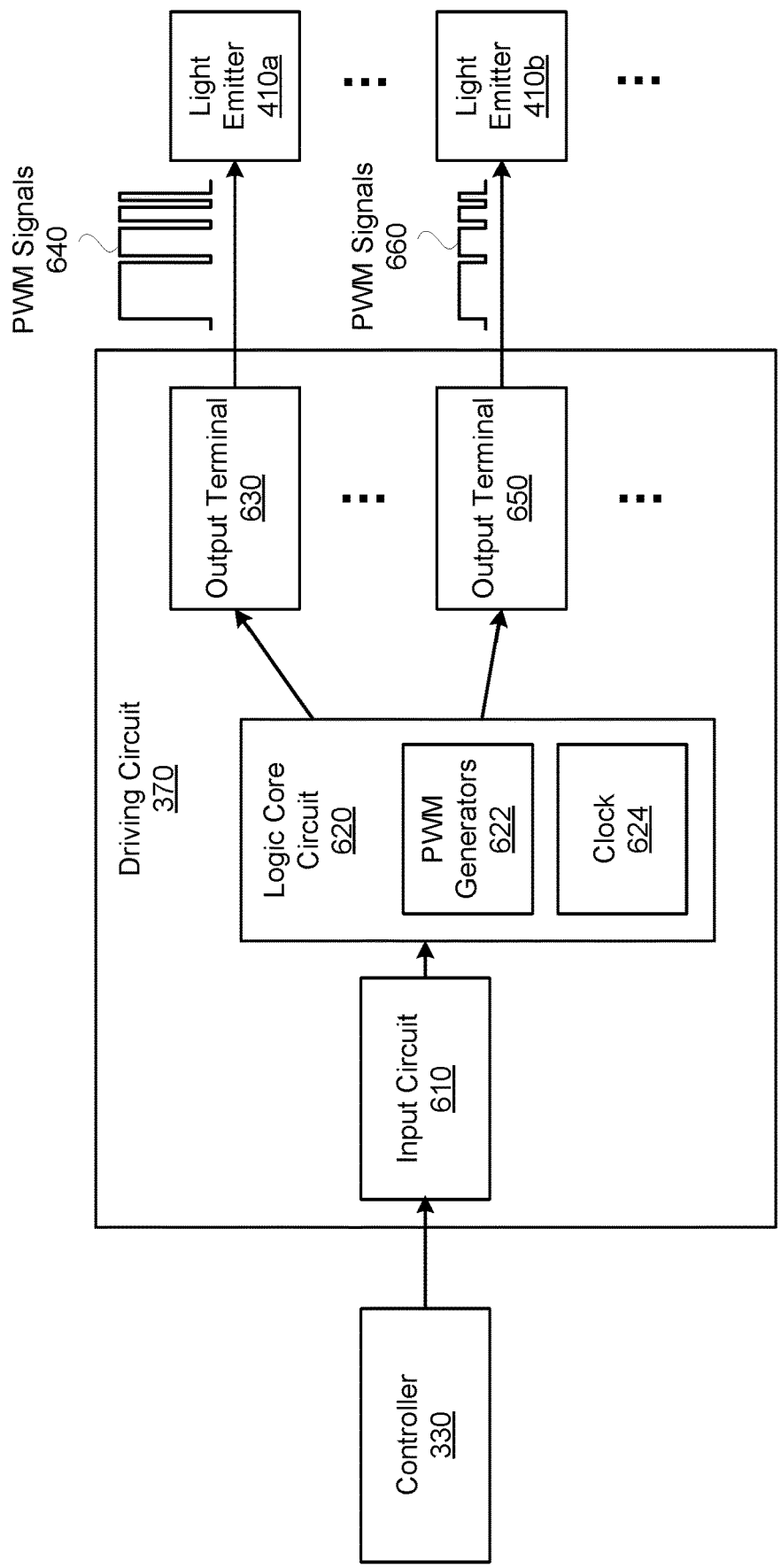
FIG. 6 is a block diagram illustrating structure of a driving circuit of a display device, in accordance with an embodiment.

FIG. 6 is a block diagram illustrating the structure of the driving circuit 370, in accordance with an embodiment. The driving circuit 370 may be connected to the controller 330 and a plurality of light emitters 410 (shown as example light emitters 410a and 410b). The driving circuit 370 receives scanning instructions from the controller 330 and, based on the scanning instructions, provide modulated driving signals to a plurality of light emitters 410 to operate the light emitters 410. The scanning instructions may include timing signals (e.g. clock signals) and multiple sets of pixel data that includes color values for pixel locations at a given time. For example, for a given orientation of mirror 520 (shown in FIG. 5A), a number of pixel locations are illuminated. For each pixel location, the controller 330 may transmit a set of pixel data that represent the color value for the pixel location. Each set of pixel data may be represented in red-green-blue (RGB) values. For example, the set 234, 131, 54 is an example 8-bit RGB values that represent the overall color at a pixel location. Depending on the image to be formed, different pixel locations at different times correspond to different sets of pixel data. As the mirror 520 rotates, the controller 330 may continuously transmit different sets of pixel data to the driving circuit 370. In some embodiments, there can be more than three primary colors and/or the three primary colors do not have to be red, green, and blue. For example, the display can be a RGBC (with an addition of cyan) display or a RGBY (with an addition of yellow).

While the driving circuit 370 is depicted as another component of the controller 330 in FIG. 6, the driving circuit 370 may also be a sub-component of the controller 330.

The driving circuit 370 may be in any suitable structure that is used to generate and modulate driving signals sent to the light emitters 410. The driving circuit 370 may be in the form of any digital and/or analog circuit. In one embodiment, the driving circuit 370 may be in the form of an active matrix that includes a plurality of data drivers and scan drivers used to drive the light emitters 410. In general, the driving circuit 370 includes an input circuit 610, a logic core circuit 450, and a plurality of output terminals 630, 650, etc. Each output terminal 630, 650, etc. may be connected to a light emitter 410 or a plurality of emitters 410 (such as a row of light emitters 410 in the case of an active matrix arrangement).

The input circuit 610 includes a receiver to receive multiple sets of pixel data from the controller 330. Each set of pixel data represents a color value for a pixel location at a given time. The pixel data includes a set of bits. For example, pixel data of red value of 146 may be represented by the bits 10010010. When the input circuit 610 receives the sets of pixel data, the input circuit 610 transmits the pixel data to the logic core circuit 450 for processing and modulation.

The logic core circuit 450 may be implemented using any suitable digital circuit that may include a processor (e.g., a microprocessor or a microcontroller) or may take the form of a dedicated circuit for processing input signals of pixel data and for modulating output driving signals. The logical core circuit 450 may include one or more pulse width modulation (PWM) generators 622 and a clock 624. A PWM generators 622 generate PWM signals as driving signals to operate the light emitters 410. The clock 624 synchronizes the cycles of different PWM signals sent to different light emitters 410 and also allows PWM cycles to be controlled.

The logic core circuit 450 processes the received input pixel data and modulates the pixel data to generate output PWM pulse signals. For each pixel at a given time, the corresponding pixel data includes a set of bits. The logic core circuit 450 separate the set of bits into a first subset of bits and a second subset of bits. In one case, each set of input pixel data includes red-green-blue (RGB) color values. The color values may also be in other color coordinates such as hue-saturation-luminance (HSL). Each color value may be any suitable formats (e.g., a numeral value 0-255 in RGB scale in the case of 8-bit depth) and can be represented by a binary value such as a combination of eight 1 or 0 in the case of 8-bit depth. The logic core circuit 450 separates the set of bits of the binary values (each represents, e.g., red, green, or blue) into a first subset of bits and a second subset of bits. In one embodiment, the separation is based on the values represented by each bit. In other words, the binary number can be separated based on the most significant bits (MSBs) and the least significant bits (LSBs). The first subset of bits corresponds to the MSBs while the second subset of bits corresponds to the LSBs. In one example, the first 4 bits of an 8-bit number are classified as the MSBs and the last 4 bits of the 8-bit number are classified as the LSBs. In another example, the first 5 bits of a 10-bit number are classified as the MSBs and the last five bits of a 10-bit number are classified as the LSBs. While these examples divide the bits equally between the MSBs and LSBs, other examples may divide the bits differently (e.g., 3 MSBs and 5 LSBs in an 8-bit number).

Using the PWM generators 622 and the clock 624, the logic core circuit also modulates the first subset of bits and the second subset of bits into a plurality of PWM signals. The clock 624 may control the timing of a PWM cycle and the synchronization among different PWM signals and cycles. The PWM generators 622 control the turn-on times of each PWM signal modulated based on the corresponding subset of bits. For example, the turn-on times of a first PWM signal corresponding to a first subset of bits may be different from the turn-on times of a second PWM signal correspond to a second subset of bits even though the first and second subsets of bits. PWM signals corresponding to the first subset of bits (e.g., MSBs) may be modulated with current at a first level that is different from the current at a second level of the PWM signals corresponding to the second subset of bits (e.g., LSBs), as depicted by the difference in magnitude in PWM signals 640 and PWM signals 660. At a given time (e.g., a given time corresponding a given orientation of the mirror 520), multiple PWM signals are generated for different pixel locations. For a given display period, multiple sets of pixel data corresponding to different pixel locations are sent to driving circuit 370 for modulation.

The driving circuit 370 also includes a plurality of output terminals, such as output terminals 630 and 650. Each output terminal is connected to one or more light emitters. For example, a first example output terminal 630 is connected to a light emitter 410a or a row of multiple light emitters 410a. A second example output terminal 650 is connected to a light emitter 410b or a row of multiple light emitters 410b. The first output terminal 630 provides current of a first level to turn on the light emitter 410a during first turn-on times within a PWM cycle in a display period based on the first subset of bits. The second example output terminal 650 provides current of a second level to turn on the light emitter 410b during second turn-on times within the PWM cycle in the display period based on the second subset of bits.

Figure 7:
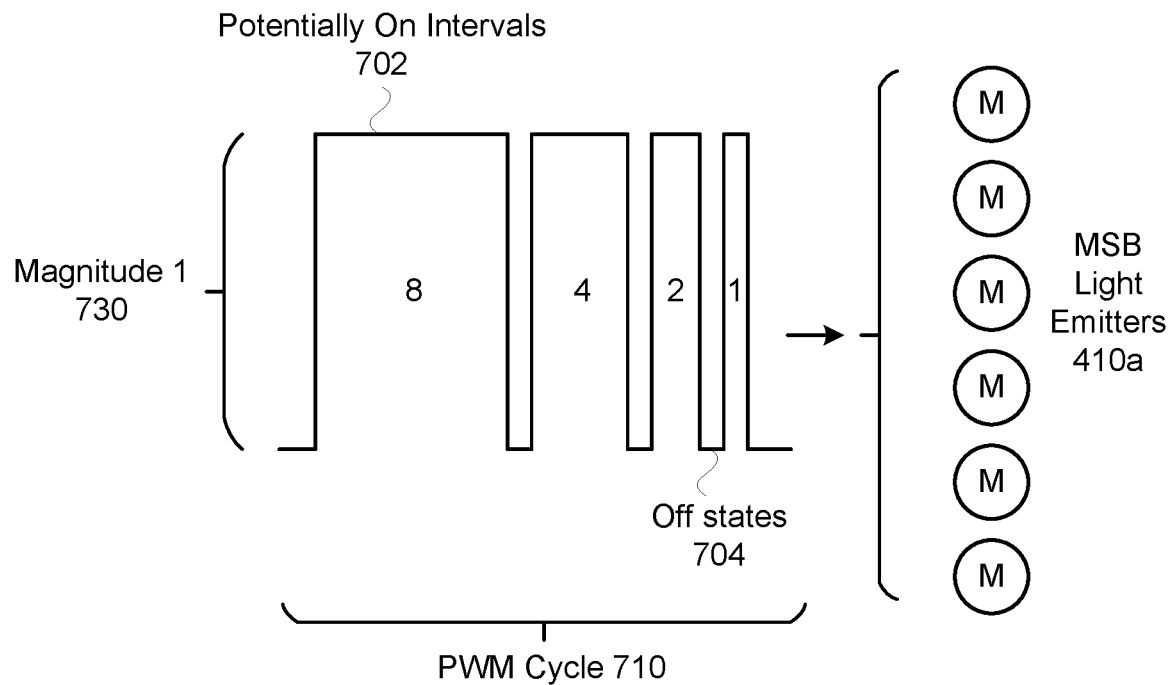
FIG. 7 is a conceptual diagram illustrating the pulse width modulations (PWMs) that drive different light emitters of a display device, in accordance with an embodiment.
Figure 7:
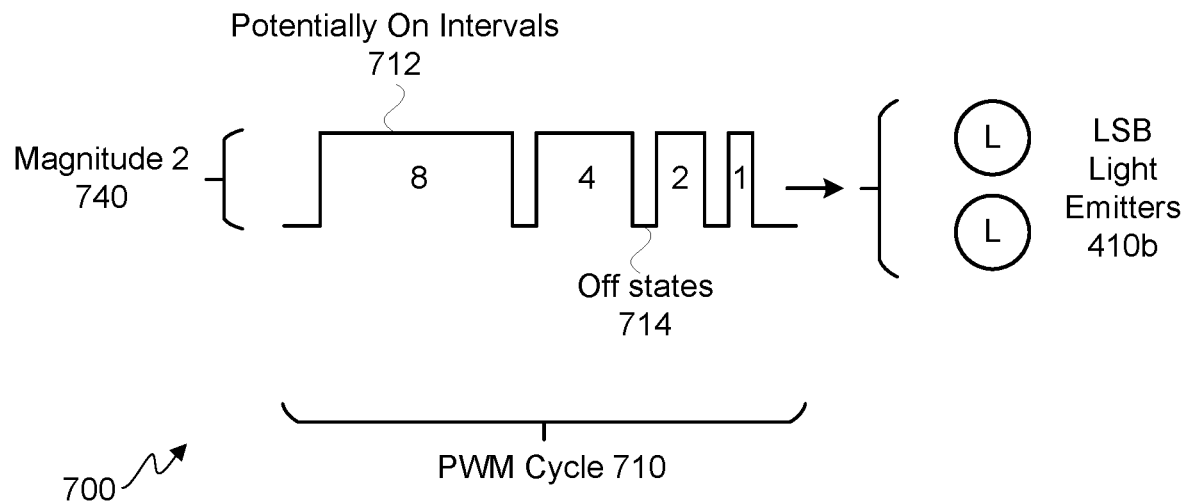

FIG. 7 is a conceptual diagram 700 illustrating operations of two or more light emitters using PWM schemes, in accordance with an embodiment. FIG. 7 shows a cooperation of 6 MSB light emitters 410a and 2 LSB light emitters 410b to generate a desired color value. While a particular combination of 6 MSB light emitters and 2 LSB light emitters are shown in FIG. 7 as an example, other combinations of numbers of MSB and LSB light emitters are also possible. For example, there can be only one MSB light emitter and one LSB light emitter in one embodiment and 8 MSB light emitters and 2 LSB light emitters in another embodiment. Also, the MSB light emitters 410a and LSB light emitters 410b may be arranged in a straight line in the display device (e.g., a row or a column), but they may also be arranged in other configuration (e.g., in a rectangular or in another geometrical shape).

The MSB light emitters 410a and LSB light emitters 410b are driven by PWM signals. In a PWM cycle 710, there can be multiple discrete intervals of potential turn-on times. A turn-on time refers to a time interval in which current is supplied to a light emitter (i.e., when the light emitter is turned on). By the same token, an off-time or an off state refers to a time interval in which current is not supplied to a light emitter (i.e., when the light emitter is turned off). Whether a light emitter is really turned on in one of the potentially on-intervals 702 or 712 may depend on the actual bit value during the modulation. The off states 704 and 714 are off intervals that respectively separate the potentially on-intervals 702 and the potentially on-intervals 712.

In a PWM cycle 710, there may be more than one potentially on-intervals and each potentially on-interval may be discrete (e.g., separated by an off state). Using PWM 1 modulation scheme in FIG. 7 as an example, the number of potentially on-intervals 702 may depend on the number bits in an MSB subset of bits on which the modulation is based. A color value of an input pixel data may be represented in a binary form that has a number of bits. The bits are separated into two subsets. The first subset may correspond to the MSB subset. The number of potentially on-intervals 702 in a PWM cycle 710 may be equal to the number of bits in the MSB subset. For example, when first 4 bits of an 8-bit input pixel data are classified as MSBs, there may be 4 potentially on-intervals 702, each separated by an off state 704, as shown in FIG. 7. In another example, when the pixel data has 10 bits, the first 5 bits of the pixel data may be classified as MSBs and the number of potentially on-intervals 702 may be 5.

The lengths of the potentially on-intervals 702 within a PWM cycle 710 may be different but proportional to each other. For example, in the example shown in FIG. 7, which may correspond to an implementation for 8-bit input pixel data, the first potentially on-interval 702 has 8 units of length, the second potentially on-interval 702 has 4 units of length, the third potentially on-interval 702 has 2 units of length, and the last potentially on-interval 702 has 1 unit of length. Each potentially on-interval 702 may be driven by the same current level. The lengths of intervals in this type of 8-4-2-1 scheme correspond to the bits of the subset MSBs or LSBs. For example, for MSBs that have 4 bits, the first bit is twice more significant than the second bit, the second bit is twice more significant than the third bit, and the third bit is twice more significant than the last bit. In total, the first bit is 8 times more significant than the last bit. Hence, the 8-4-2-1 scheme reflects the differences in significance among the bits.

This 8-4-2-1 scheme is not the only possible scheme for 8-bit input pixel data and the scheme is also not limited to be used with 8-bit input pixel data. Other pixel data with other numbers of bits may also use the same 8-4-2-1 scheme or a similar scheme. For example, for 10-bit input pixel data, a 16-8-4-2-1 scheme with 5 potentially on-intervals may be used for each subset for MSBs or LSBs. Also, the order of potential on-intervals 8-4-2-1 is for example only and does not have to be ascending or descending. For example, the order may also be 1-2-4-8 or 2-8-1-4, etc.

The levels of current driving the MSB light emitters 410*a* and driving the LSB light emitters 410*b* are different, as shown by the difference in magnitudes in the first magnitude 730 and the second magnitude 740. The MSB light emitters 410*a* and the LSB light emitters 410*b* are driven with different current levels because the MSB light emitters 410*a* represent bit values that are more significant than those of the LSB light emitters 410*b*. In one embodiment, the current level driving the LSB light emitters 410*b* is a fraction of the current level driving the MSB light emitters 410*a*. In one embodiment, the fraction is proportional to a ratio between the number of MSB light emitters 410*a* and the number of LSB light emitters 410*b*. For example, in an implementation of 8-bit input pixel data that has the MSB light emitters 410*a* three times more than the LSB light emitters 410*b* (e.g., 6 MSB emitters and 2 LSB emitters), a scale factor of 3/16 may be used (3 is based on the ratio). As a result, the perceived light intensity (e.g., brightness) of the MSB light emitters for the potentially on-intervals corresponds to the set [8, 4, 2, 1], while the perceived light intensity of the LSB light emitters corresponds to the set [8, 4, 2, 1]*(⅓ of the number)*(3/16 scale factor)=[½, ¼, ⅛, 1/16]. As such, the total levels of greyscale under this scheme is 2 to the power of 8 (i.e., 256 levels of greyscale).

In another example, in an implementation of 10-bit input pixel data that also has 6 MSB light emitters 410*a* and 2 LSB light emitters 410*b*, a scale factor of 3/32 and a 16-8-4-2-1 scheme may be used. The perceived light intensity of the MSB light emitters for the potentially on-intervals corresponds to the set [16, 8, 4, 2, 1], while the perceived light intensity of the LSB light emitters corresponds to the [16, 8, 4, 2, 1]*(⅓ of the number)*(3/32 scale factor)=[½, ¼, ⅛, 1/16, 1/32]. As such, the total level of greyscale under this scheme is 2 to the power of 10 (i.e., 1024 levels of greyscale).

Since different current levels are used and two or more PWM schemes are used to drive the light emitters, the PWM schemes may be referred to as hybrid PWMs.

The hybrid PWM modulation schemes that separate input pixel data into two subsets to drive different light emitters are advantageous over other methods. MicroLEDs that might be used as the light emitters may emit different wavelengths of light (i.e., may have a color shift) when different currents or voltages are supplied to the microLEDs. For example, even for the light emitters of the same color, a first light emitter may emit light at a first wavelength while the second light emitter of the same color may emit light at a second wavelength that is shifted compared to the first wavelength as a result of the difference in current or voltage levels. The control of the greyscale of the microLEDs may be achieved by controlling the turn-on times of a microLED in a cycle so that the perceived brightness of the microLED is the temporal sum of the turn-on times within the PWM period. However, for 8-bit input pixel data, the first bit (most significant) and the last bit (least significant) has a difference in level of significance of 256 times (1024 times in the case of 10-bit data). Hence, when the input pixel data is represented by a single light emitter without the separation of the bits into two subsets, the on-length corresponding to the last bit has to be 1/256 times of the on-length corresponding to the first bit. In the case of 10-bit data, the fraction is 1/1024 times. The representation of a color value without separation of two subsets requires an extremely fast clock and may be very challenging or even impractical to achieve. Separation the pixel data into two subsets solve this problem as the difference between the longest on-time interval and the shortest on-time interval is significantly reduced (only a difference of 8 times in the example shown in FIG. 7).

While the example in FIG. 7 shows that the pixel data is separated into two subsets of bits, embodiments described herein may also separate a color value of the pixel data into three or more subsets of bits and have three or more different PWM schemes to drive different light emitters.

Figure 8:
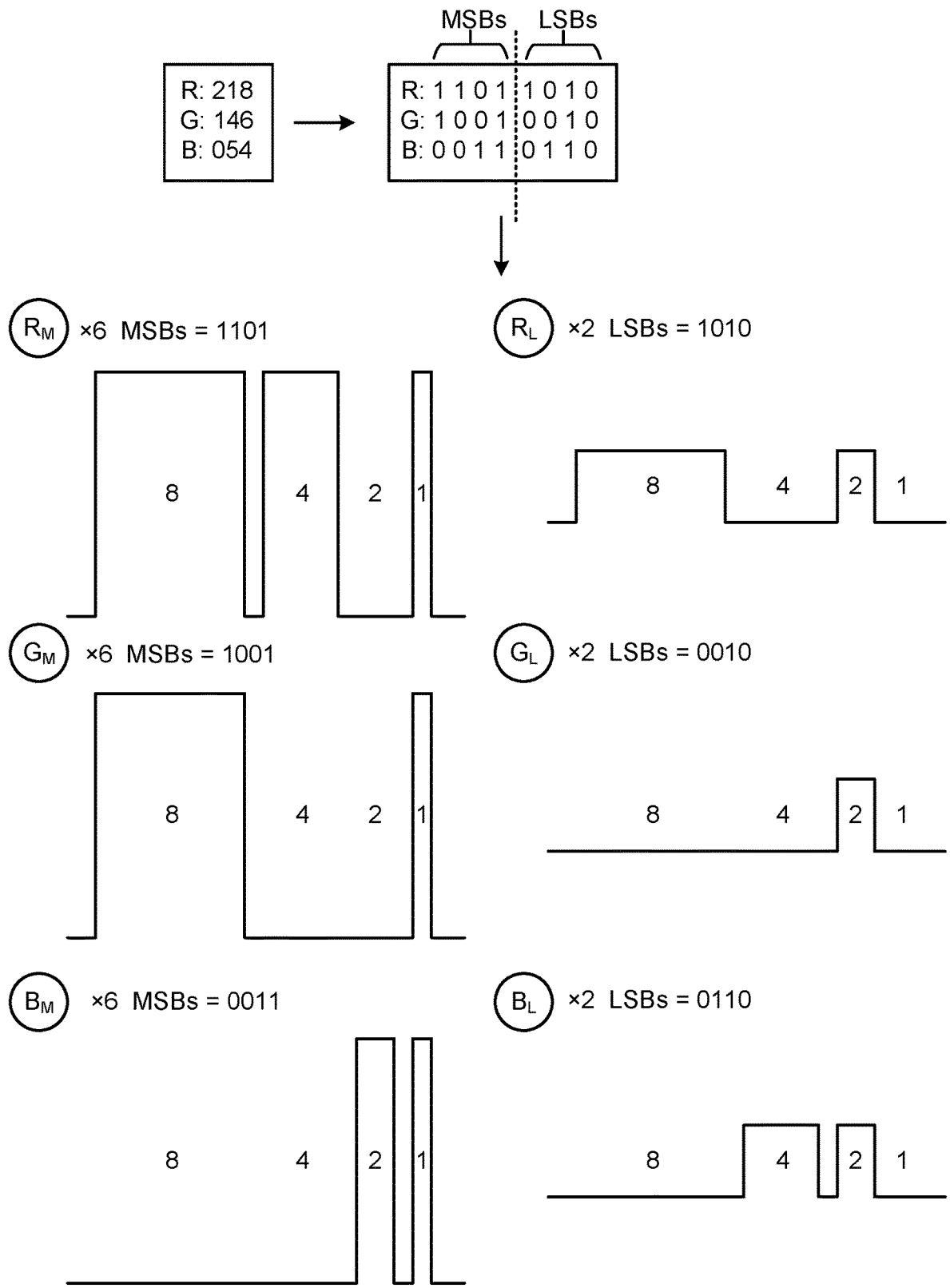
FIG. 8 is a conceptual diagram illustrating the generation of a color using PWM modulated driving signals, in accordance with an embodiment.

FIG. 8 is a conceptual diagram illustrating the generation of a precise color at a pixel location based on a cooperation of multiple light emitters using PWM modulation schemes, in accordance with an embodiment. In the example shown in FIG. 8, each of the red, green, and blue colors are 8 bits, but such a specific bit depth is for illustration purpose only. In FIG. 8, 8 red light emitters, 8 green light emitters, and 8 blue light emitters cooperate to generate a color at a pixel location. This combination of numbers of RGB light emitters are for example only and other combinations of numbers of RGB light emitters may be used. For example, in one embodiment, there are 10 red light emitters, 10 green light emitters, and 4 blue light emitters because blue light emitters are brighter and/or have more dominating effect from the perspective of human eyes. The RGB light emitters correspond to a pixel location, but a display device includes multiple pixel locations. Hence, a display device may include 10 rows of red light emitters, 10 rows of green light emitters, and 4 rows of blue light emitters, or in such proportion. Each light emitter shown in FIG. 8 is driven by the 8-4-2-1 PWM scheme, but other light emitters may also be driven by different PWM schemes.

In FIG. 8, 6 red light emitters, $R_M$, are responsible for the MSBs of the red color value, and 2 red light emitters, $R_L$, are responsible for the LSBs of the red color value. Likewise, the green light emitters and blue light emitters are represented by $G_M$, $G_L$, $B_M$, and $B_L$.

The process of delivering a color at a pixel location includes a receipt of pixel data that includes a set of RGB color values (e.g., R=218, G=146, and B=054). The RGB color values can be represented in binary froms. For example, 218 is equivalent to the binary number 11011010, 146 is equivalent to the binary number 10010010, and 054 is equivalent to the binary number 00110110. Each binary number is separated into MSBs and LSBs. For the red color, the binary number 11011010 is separated into MSBs of 1101 and LSBs of 1010. For the green color, the binary number 10010010 is separated into MSBs of 1001 and LSBs of 0010. For the blue color, the binary number 00110110 is separated into MSBs of 0011 and LSBs of 0110.

After the bits are separated into subsets of bits, the light emitters are driven in different turn-on times based on different binary bits. The potentially on-intervals in each of the 8-4-2-1 cycle are turned on or off based on whether the corresponding bit is 1 or 0. For example, 1 might represent the light emitter should be turned on while 0 might represent the light emitter should be turned off. As a result, for the 6 red emitters $R_M$, since the MSBs is 1101, the potentially on-intervals for length 8, 4, and 1 are turned on while the potentially on-interval for length 2 is turned off. Likewise, for the 2 red emitters $R_L$, since the LSBs is 1010, the potentially on-intervals for length 8 and 2 are turned on while the potentially on-intervals for length 4 and 1 are turned off. Other light emitters $G_M$, $G_L$, $B_M$, and $B_L$ are driven by the same manner.

As a result, the precise color at a pixel location is an average of all $R_M$, $R_L$ $G_M$, $G_L$, $B_M$, and $B_L$ light emitters. In one embodiment, light from all six types of $R_M$, $R_L$ $G_M$, $G_L$, $B_M$, and $B_L$ light emitters for a pixel location is projected onto the pixel location within the same PWM cycle. For example, the pixel location may be divided in color sub-pixel location. In another embodiment, light from different types of light emitters for a pixel location is projected onto the pixel location sequentially within a few PWM cycles. For example, in one embodiment, the $R_M$ and $R_L$ light emitters project light to the pixel location in a first PWM cycle. As the mirror 520 (shown in FIG. 5) rotates, the $G_M$ and $G_L$ light emitters project light to the same pixel location in a second PWM cycle. As the mirror 520 rotates again, the $B_M$ and $B_L$ light emitters project light to the same pixel location in a third PWM cycle. As the mirror 520 rotates at a fast rate, the color value of the pixel location is perceived as the average of the three color light emitters.

Figure 9:
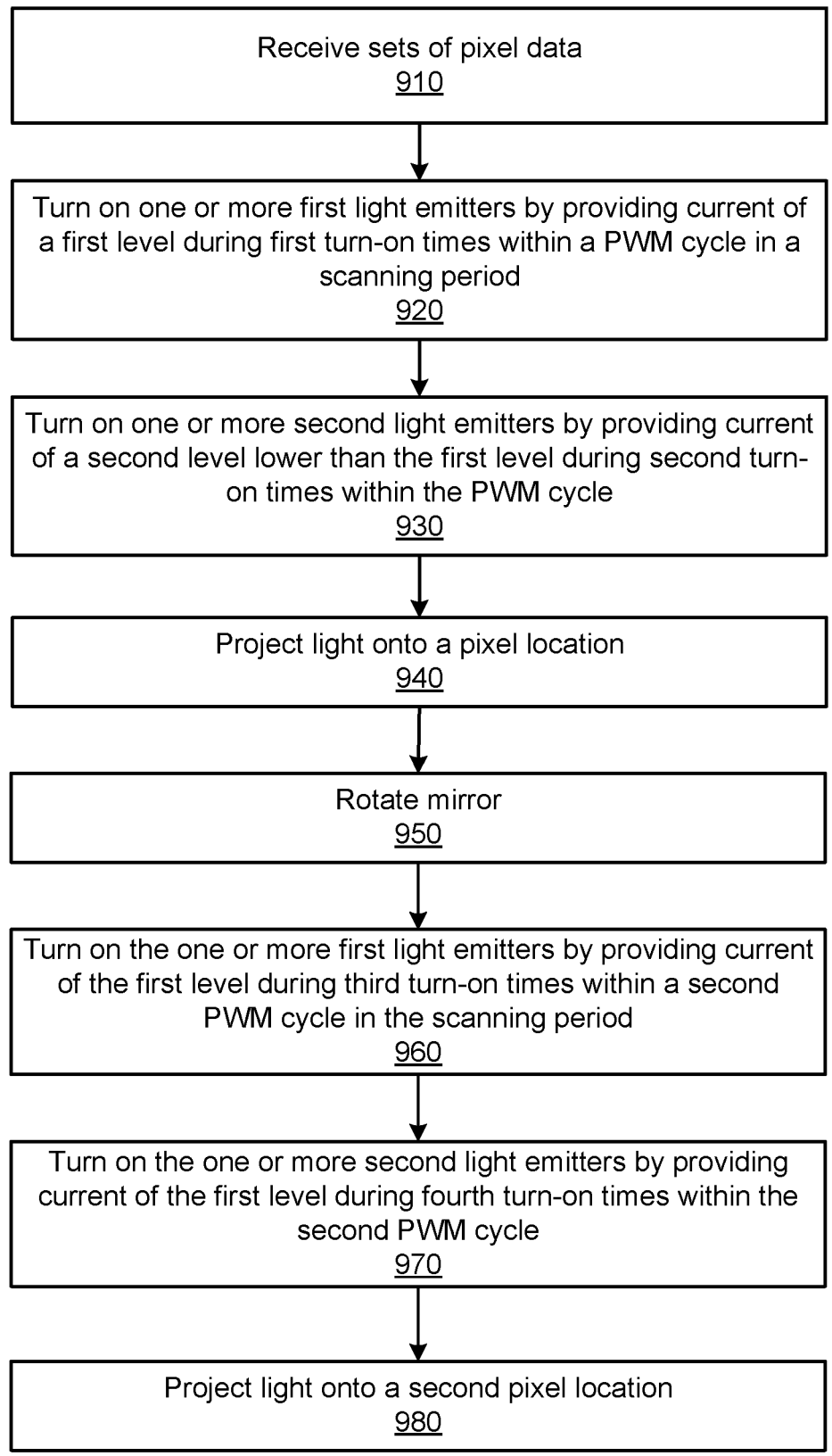
FIG. 9 is a flowchart depicting a process of operating a display device, in accordance with an embodiment.

FIG. 9 is a flowchart depicting a process of operating a display device, in accordance with an embodiment. The process may be operated by a display device with a rotatable mirror that projects light emitted by light emitters to different pixel locations in an image field at different orientations. The display device receives 910 sets of pixel data. Each pixel data may represent the color of a pixel at a certain time and may include a set of RGB values represented by numbers (convertible to bits) or directly by bits. In response, the display device separates the pixel data into a first subset of bits and a second subset of bits. Based on the first subset of bits, the display device turns on 920 one or more first light emitters by providing current of a first level during first turn-on times within a PWM cycle in a display period. The length of the total of the first turn-on times within the PWM cycle corresponds to the value of the first subset of bits (e.g., the larger the value, the longer is the first turn-on times). Based on the second subset of bits, the display device turns on 930 one or more second light emitters by providing current of a second level lower than the first level during second turn-on times within the PWM cycle in the display period. The second level of current may be a fraction of the first level of current and the fraction may be based on the ratio between the number of first light emitters and the number of second light emitters. The length of the total of the second turn-on times within the PWM cycle corresponds to the value of the second subset of bits (e.g., the larger the value, the longer is the second turn-on times). In one case, the first turn-on times correspond to the value of MSBs of the pixel data while the second turn-on times correspond to the value of LSBs of the pixel data.

The display device, through the mirror, projects 940 light generated by the one or more first light emitters and light generated by the one or more second light emitters onto a first pixel location during the PWM cycle. In one embodiment, the first light emitters and the second light emitters both emit the same color of light. That color at the pixel location becomes the average of the color brightness of the total of the first light emitters and the second light emitters. In one embodiment, other light emitters of different colors also project light of different colors onto the same pixel location so that the total color value at the pixel location is the average of all light emitters by those light emitters. In another embodiment, other light emitters of different colors project light onto the same pixel location in subsequent PWM cycles. For example, red light emitted by MSB light emitters and by LSB light emitters is first projected on the pixel location. As the mirror rotates, green light is then projected to the same pixel location in a subsequent PWM cycle. Blue light is next projected to the same pixel location.

The display device may include more than one set of RGB light emitters that are responsible for different pixel locations at the same time. For example, a row of pixel locations (or multiple rows of pixel locations) may be illuminated at the same time. The display device drives different sets of light emitters using different PWM signals to generate an image with various colors at different pixel locations.

In the next PWM cycle, the display device rotates 950 the mirror to another orientation. The display device turns on 960 the one or more first light emitters by providing the same current of the first level for a duration of third turn-on times within a second PWM cycle in the display period. While the current level provided to the first light emitters may be the same in the first PWM cycle and the second PWM cycle, the length of the first turn-on times may be different than the length of the third turn-on times because another set of pixel data determines the third turn-on times. The third turn-on times corresponds to another first subset of bits (e.g., MSBs) of second pixel data that may be different from the first pixel data. Likewise, the display device turns on 970 the one or more second light emitters by providing the same current of the second level for a duration of fourth turn-on times within the second PWM cycle in the display period. The fourth turn-on times corresponds to the second subset of bits of the second pixel data (e.g., LSBs). As the orientation of the mirror has changed, the display device projects 980 light generated by the first light emitters and light generated by the second light emitters onto a second pixel location that is different from the first pixel location.

The process described in 950-980 may be repeated for multiple times as the light generated by the light emitters scan through the entire image field within a display period. Each display period may include a plurality of PWM cycles. In one embodiment, if the image field of the display device has 1024 rows of pixel locations, the display period may include 1024 different mirror orientations and 1024 PWM cycles. In another embodiment, a display device may include multiple rows of light emitters. Hence, several rows of pixel locations may be illuminated at once. The number of PWM cycles within a display period may be reduced. As a display period is completed, an image is formed on the image field. The mirror of the display device returns to its original position and a new display period begins.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method for operating a display device, comprising:
    receiving a pixel data value of a color for a pixel location;
    dividing the pixel data value of the color into a first set of bits and a second set of bits, each of the first set and the second set comprising a plurality of bits, the first set of bits corresponding to most significant bits (MSBs) and the second set of bits corresponding to least significant bits (LSBs);

generating a first pulse width modulation (PWM) signal representing the first set of bits;
driving a plurality of first light emitters of the color using the first PWM signal by providing current of a first level during first turn-on times within a PWM cycle in a display period, the first turn-on times corresponding to the first set of bits represented by the first PWM signal;
projecting light generated by the plurality of first light emitters onto the pixel location in the display period;
generating a second PWM signal representing the second set of bits;
driving a plurality of second light emitters of the same color using the second PWM signal during second turn-on times within the PWM cycle in the display period, the plurality of second light emitters separated from the plurality of first light emitters and driven by current of a second level lower than the first level, the second turn-on times corresponding to the second set of bits represented by the second PWM signal; and
projecting light generated by the plurality of second light emitters onto the pixel location in the display period.

2. The method of claim 1, wherein the first light emitters and the second light emitters are arranged in a two-dimensional matrix of light emitters that are configured to project light onto an image field.

3. The method of claim 1, wherein the first set of bits representing the first turn-on times of the plurality of first light emitters and to the second set of bits representing the second turn-on times of the plurality of second light emitters.

4. The method of claim 1, wherein the MSBs corresponds to a first half of bits of the pixel data and the LSBs corresponds to a second half of bits of the pixel data.

5. The method of claim 1, wherein the PWM cycle comprises a plurality of discrete intervals, the first turn-on times correspond to a first set of discrete intervals that are turned on, and the second turn-on times correspond to a second set of discrete intervals that are turned on.

6. The method of claim 5, wherein each of the plurality of discrete intervals have different lengths.

7. The method of claim 5, wherein each of the plurality of discrete intervals corresponds to a single bit of the pixel data value.

8. The method of claim 1, wherein the second level is a fraction of the first level, the fraction being proportional to a ratio between a first number of the plurality of first light emitters and a second number of the plurality of second light emitters.

9. The method of claim 1, further comprising:
rotating a mirror of the display device;
turning on the plurality of first light emitters by providing current of the first level during third turn-on times within a second PWM cycle in the display period;
turning on the plurality of second light emitters by providing current of the second level during fourth turn-on times within the second PWM cycle in the display period; and
projecting light generated by the plurality of first light emitters and light generated by the plurality of second light emitters during the second PWM cycle onto a second pixel location different from the pixel location during the display period.

10. The method of claim 1, wherein the first light emitters emit light of a first wavelength and the second light emitters emit light at a second wavelength, the first and second wavelength belongs to same color and the second wavelength is shifted compared to the first wavelength.

11. A display device, comprising:
a plurality of light emitters comprising a plurality of first light emitters of a color and a plurality of second light emitters of the same color, the one or more second light emitters separated from the one or more first light emitters;
a driving circuit configured to:
receive a pixel data value of the color for a pixel location;
divide the pixel data value of the color into a first set of bits and a second set of bits, each of the first set and the second set comprising a plurality of bits, the first set of bits corresponding to most significant bits (MSBs) and the second set of bits corresponding to least significant bits (LSBs),
generate a first pulse width modulation (PWM) signal representing the first set of bits,
drive the plurality of first light emitters of the color using the first PWM signal by providing current of a first level during first turn-on times within a PWM cycle in the display period, the first turn-on times corresponding the first set of bits represented by the first PWM signal, and
generating a second PWM signal representing the second set of bits;
drive the plurality of second light emitters of the same color using the second PWM signal during second turn-on times within the PWM cycle in the display period, the plurality of second light emitters driven by current of a second level lower than the first level, the second turn-on times corresponding to a second set of bits represented by the second PWM signal; and
an optics assembly configured to project light generated by the one or more first light emitters and light generated by the one or more second light emitters onto the pixel location in the display period.

12. The display device of claim 11, wherein the MSBs corresponds to a first half of bits of the pixel data and the LSBs corresponds to a second half of bits of the pixel data.

13. The display device of claim 11, wherein the plurality of light emitters comprises ten rows of red light emitters, ten rows of green light emitters, and four rows of blue light emitters.

14. The display device of claim 11, wherein the optics assembly is rotatable to project light generated by the one or more first light emitters and the one or more second light emitters to different pixel locations during the display period.

15. The display device of claim 14, wherein the PWM cycle corresponds to a first orientation of the optical assembly that is configured to project light onto the first pixel location and a second PWM cycle corresponds to a second orientation of the optical assembly that is configured to project light onto the second pixel location different from the first pixel location.

16. The display device of claim 14, wherein the display period corresponds to a period of rotation of the optical assembly.

17. The display device of claim 11, wherein the second level is a fraction of the first level, the fraction being proportional to a ratio between a first number of the plurality of first light emitters and a second number of the plurality of second light emitters.

18. A driving circuit of a display device, comprising:
an input circuit configured to receive a pixel data value representing a color at a pixel location;
a logic core circuit configured to separate the pixel data value into a first set of bits and a second set of bits, each of the first set and the second set comprising a plurality of bits, the first set of bits corresponding to most significant bits (MSBs) and the second set of bits corresponding to least significant bits (LSBs);
a first output terminal connected to a plurality of first light emitters of the color, the first output terminal configured to provide, based on the first subset of bits, current of a first level to turn on the one or more first light emitters during first turn-on times within a pulse width modulation (PWM) cycle in a display period, the first turn-on times corresponding to a first set of bits represented by the first PWM signal; and
a second output terminal connected to a plurality of second light emitters of the same color, the one or more second light emitters separated from the one or more first light emitters and driven by current of a second level lower than the first level, the second output terminal configured to provide, based on the second subset of bits, current of the second to turn on the one or more second light emitters during second turn-on times with the PWM cycle in the display period, the second turn-on times corresponding to a second set of bits represented by the second PWM signal.

19. The driving circuit of claim 18, wherein the MSBs corresponds to a first half of bits of the pixel data and the LSBs corresponds to a second half of bits of the pixel data.

20. The driving circuit of claim 18, wherein the PWM cycle comprises a plurality of discrete intervals, the first turn-on times correspond to a first set of discrete intervals that are turned on, and the second turn-on times correspond to a second set of discrete intervals that are turned on.

* * * * *